US012793405B2

(12) United States Patent
Taylor et al.

(10) Patent No.: US 12,793,405 B2
(45) Date of Patent: Nov. 10, 2026

(54) AUTOMATIC DETERMINATION OF NOISE PROFILES FOR IMAGE SENSORS

(71) Applicant: NVIDIA Corporation, Santa Clara, CA (US)

(72) Inventors: Douglas John Taylor, Santa Clara, CA (US); Robin Brian Jenkin, Morgan Hill, CA (US)

(73) Assignee: NVIDIA Corporation, Santa Clara, CA (US)

( * ) Notice: Subject to any disclaimer, the term of this patent is extended or adjusted under 35 U.S.C. 154(b) by 270 days.

(21) Appl. No.: 18/543,417

(22) Filed: Dec. 18, 2023

(65) Prior Publication Data

US 2025/0200963 A1 Jun. 19, 2025

(51) Int. Cl.
*G06V 10/98* (2022.01)
*H04N 17/00* (2006.01)
*H04N 23/60* (2023.01)

(52) U.S. Cl.
CPC ......... *G06V 10/993* (2022.01); *H04N 17/002* (2013.01); *H04N 23/64* (2023.01)

(58) Field of Classification Search
None
See application file for complete search history.

(56) References Cited

U.S. PATENT DOCUMENTS

2007/0071342 A1* 3/2007 Bilbrey ...................... G06T 5/20 382/254
2010/0207754 A1* 8/2010 Shostak .............. B60C 23/0433 340/572.1
2011/0297828 A1* 12/2011 Weisbach ............. H04N 25/589 250/330
2017/0318240 A1* 11/2017 Yu ............................ G06T 5/20
2020/0195906 A1* 6/2020 Van Hoff ............. H04N 13/296
2025/0047825 A1* 2/2025 Malkin .................. H04N 25/70
2025/0201153 A1* 6/2025 Pillans ................... G09G 3/001
2026/0010983 A1* 1/2026 Davy ........................ G06T 5/70

OTHER PUBLICATIONS

Pan et al., "Effect of camera temperature variations on stereo-digital image correlation measurements," Applied Optics, vol. 54, No. 34, Dec. 1, 2015 (Year: 2015).*
De Souza Bachour et al., "Skin-color independent robust assessment of capillary refill time," J Biophotonics, Nov. 2023; 16(11):e202300063. doi: 10.1002/jbio.202300063. Epub Aug. 10, 2023 (Year: 2023).*

* cited by examiner

*Primary Examiner* — Soo Shin
(74) *Attorney, Agent, or Firm* — Lowenstein Sandler LLP

(57) ABSTRACT

Apparatuses, systems, and techniques to determine that a first image and a second image generated by an image sensor are images of a same static scene; and determine that a noise estimate for the image sensor based at least on a difference between first values of a first subset of pixels of the first image and second values of a corresponding second subset of pixels of the second image.

16 Claims, 15 Drawing Sheets

AUTOMATIC DETERMINATION OF NOISE PROFILES FOR IMAGE SENSORS

TECHNICAL FIELD

Embodiments disclosed herein generally pertain to image processing, and more specifically, to improved techniques for automatically determining noise profiles for image sensors based on image data.

BACKGROUND

Image sensors play a fundamental role in capturing visual data across a variety of applications, ranging from photograph and surveillance to medical imaging and autonomous vehicles. Image sensors may produce images with a degree of noise due to various intrinsic and extrinsic factors that affect the acquisition and processing of light signals. Image sensor noise includes random variations in pixel intensity levels. Generating an accurate noise profile for an image sensor and understanding the noise profile is useful for developing effective noise reduction techniques and algorithms. A noise profile can refer to a description (e.g., a quantization) of noise inherent in image data capture by a particular image sensor across a spectrum of conditions. Noise profiles allow researchers and developers of these noise reduction techniques to tailor their approaches to specific characteristics of noise present at image sensor output according to the noise profile. Traditionally, noise profiles for image sensors are generated in laboratory conditions (e.g., during manufacturing) based on use of calibration objects, and the noise profiles remain static for those image sensors over their lifetime.

DETAILED DESCRIPTION

Figure 1:
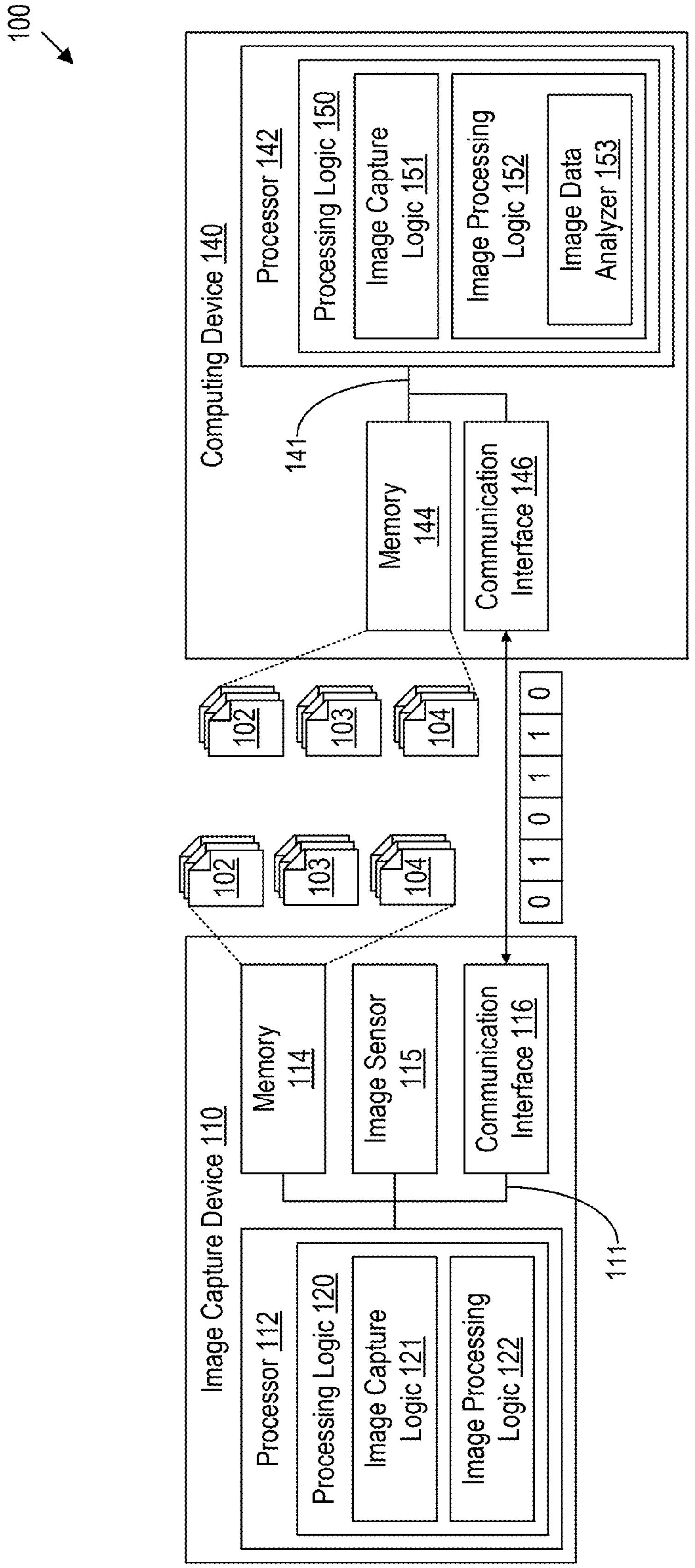
FIG. 1 illustrates an example computing environment for determining noise profiles for image sensors based on image data, in accordance with at least one embodiment of the present disclosure.

Camera image sensors are used in a wide variety of applications across various industries. For example, smartphones, video surveillance systems, automotive systems, medical imaging devices, and the like use image sensors to capture images and videos for various purposes. Image sensors often exhibit a degree of noise that can interfere with accuracy and reliability of image signal processing (ISP) tasks of an ISP pipeline. Noise in an image sensor can refer to random fluctuations in pixel values that are not related to the scene being captured by the image sensor. For example, multiple subsequent frames of a video stream captured using an image sensor may depict the same scene with no motion between frames. However, due to noise introduced by the image sensor, environmental temperature, or other factors, brightness and/or color information associated with the multiple subsequent frames may exhibit some variation.

Camera image sensors can have a measurable noise profile. A camera noise profile is a mathematical representation of noise characteristics exhibited by the camera image sensor. In some embodiments, image signal processing pipelines may leverage a noise profile associated with a particular image sensor to model noise levels under different conditions. The ISP pipeline can use the noise profile to perform noise reduction and image enhancement on images captured by the associated image sensor. Accordingly, accurate image sensor noise profiles are useful for noise reduction algorithms, sensor calibration, and the like.

Conventional approaches to determine noise profiles associated with sensors include a systematic process of capturing images in a controlled test environment using calibration objects or targets under varying conditions and analyzing statistical properties of the noise present in those images. For example, a controlled test environment may provide scenes with uniform areas, gradients, and different levels of brightness. The measured noise profile in a controlled test environment can be accurate for controlled lighting and/or temperature conditions under which it was measured, but actual noise characteristics of the image sensor in a real world environment can deviate from the noise profile measured within a controlled test environment. For example, changes in ambient temperature and light intensity can significantly differ from the exact spectrum of light and temperature used to measure the noise profile in the controlled environment, which may result in different noise profiles than those recorded in the test environment.

Capturing noise profiles for image sensors under various temperature and lighting conditions can be cost-prohibitive.

For example, specialized equipment may be used for precise measurements and calibration. Additionally, real-world conditions are often highly variable, and capturing noise profiles that cover all possible scenarios may be impractical. As such, prioritization of certain conditions is a significant technical challenge. Further still, controlled test environments may fail to account for other factors that may affect an image sensor's noise profile over the lifetime of the sensor, such as an aging sensor or sensor degradation from cosmic rays.

The introduced techniques described in embodiments includes a method to automatically measure and update a noise profile of an image sensor at an image signal processing (ISP) pipeline of the image sensor. To update a noise profile associated with the image sensor, the ISP pipeline can estimate noise based on the difference between images captured by the image sensor that depict an identical scene. In some embodiments, the ISP can determine that the images depict an identical scene based on a received input. For example, the image sensor may be mounted on a vehicle and used as a part of an automated driving system (ADS) or an advanced driver assistance system (ADAS). The ISP pipeline can receive an indication from the ADS/ADAS system that the vehicle (and therefore the image sensor) is in a motionless state. The ISP pipeline can accordingly identify images captured by the image sensor while in a motionless state and extrapolate that minimal or no scene changes occurred between the identified images. In some embodiments, the ISP pipeline can determine that the images depict an identical scene based on an amount of pixel displacement between the images according to one or more computer vision techniques. For example, the ISP pipeline can determine motion between images captured by the image sensor using frame differences, optical flow, block matching, feature tracking, background subtraction, deep learning models, and the like.

Responsive to identification of two images depicting the same scene, the ISP pipeline can determine a difference between pixels of a first image and a second image to obtain a noise estimate. In some instances, the first and second images can be subsequent video frames of a video stream captured using the image sensor. For example, the first image can be a current frame of the video stream and the second image can be previous frame of the video stream. Because the subsequent frames frames/images depict the same scene, the pixel differences between the two images/frames indicate an amount of noise associated with the image sensor. To determine the differences between the first and second images, the ISP pipeline can subtract (or otherwise compare) corresponding pixel values between the two images. In some embodiments, the ISP pipeline can perform the subtraction operation based on pixel blocks. Pixel blocks are a contiguous set or group of pixels in an image arranged in a specific spatial pattern. For example, the first and second images can respectively be composed of corresponding M×N blocks (e.g., 16×16 blocks, 4×4 blocks, 8×8 blocks, 4×8 blocks, 10×16 blocks, etc.) of pixels. A difference between corresponding blocks of pixels can indicate an estimated noise level associated with the pixel block.

In some embodiments, noise estimates of pixel block differences can be associated with a corresponding intensity value in the static scene, which may be used to obtain a noise profile of the image sensor at intensity values across the dynamic range of the sensor. The dynamic range of the sensor represents the range of light intensities that the sensor is able to capture and represent. Pixels (e.g., pixel blocks) in an image can exhibit different intensity levels indicating an amount of brightness present in the pixel block. The ISP pipeline can compute average pixel intensity values within pixel blocks. The computed average intensity level can be associated with a corresponding noise estimate to obtain a relationship between the estimated noise at the computed average intensity level. The relationship can be included within a noise profile of the sensor. The noise profile of the sensor can be periodically or continuously updated as images are captured by the sensor. Over time, the noise profile can represent the entire dynamic range of the sensor as it is updated using images that include varying degrees of intensity levels. Additionally, because the noise profile is updated continually in some embodiments (e.g., in real-time or near real-time), the noise profile may capture changes due to ambient temperature variation, sensor degradation, and the like. Such improvements in sensor noise profile estimation can increase modulation and control of noise reduction algorithms, thereby improving image quality.

Aspects of the present disclosure provide technical advantages over previous solutions. Aspects of the present disclosure can provide an additional functionality to an ISP pipeline of an image sensor to dynamically generate noise profiles for an image sensor. For example, a camera's noise profile can be updated "on the fly" for the current operating conditions. Such improvement in noise profile estimation can allow for improved modulation and control of noise reduction algorithms with an associated improvement in image quality. Existing solutions fail to continually monitor and update noise profiles associated with an image sensor throughout the operational lifetime of the sensor and fail to capture an entire dynamic range of the image sensor.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. The systems and methods described herein may be used by other systems that use image sensors, such as security cameras, webcams, digital cameras, robots, and so on. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be included in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, systems implementing one or more large language models (LLMs), systems for performing generative AI operations, and/or other types of systems.

It is appreciated that camera image sensors are described herein by way of example, and not by way of limitation. Noting that aspects and implementations of the present disclosure can be applied to any sensor data generally, such as sensor data received from, for example and without limitation, Radio Detection and Ranging (RADAR) sensors, Light Detection and Ranging (LiDAR) sensors, Infrared (IR) sensors, and/or other types of sensors.

FIG. 1 illustrates an imaging system 100 in accordance with at least one embodiment of the present disclosure. Imaging system 100 may represent any system that can be used to capture and process digital images (e.g., still images, multiple simultaneously captured images, videos comprising a sequence of image frames, etc.). Imaging system 100 may take a variety of forms, including for example, a digital camera, an automotive, aerial, or robotic vision system, a medical imaging system, a security or surveillance system, a personal computer or laptop, or other system that may capture and process digital images.

In some embodiments, imaging system 100 may include an image capture device 110 and a computing device 140. The image capture device 110 may be used to capture one or more images (e.g., of a physical scene illuminated by one or more illuminants), which in turn, may be provided to the computing device 140 for further processing. In some embodiments, the image capture device 110 may perform some initial processing (or pre-processing) of the captured images before providing them to computing device 140. The computing device 140 may receive captured images from image capture device 110 and process them further. In some embodiments, for example, the computing device 140 may perform image data analysis on the images received from image capture device 110 to produce and/or update a noise profile associated with the image sensor 115.

Image capture device 110 may take a variety of forms, including for example, a digital camera, a video camera, or a camera or sensor module that may be connected to, or integrated within, another device (e.g., a mobile phone, laptop computer, robot, aerial drone, smart appliance, automobile, etc.). The image capture device 110 may include various optical components (e.g., a lens, mirror, shutter, etc.) and one or more image sensor(s) 115 that the image capture device 110 may use to capture an image of a scene. The image sensor(s) 115 may include any of a variety of optical sensors, including a charge-coupled device (CCD) or an active-pixel sensor (APS), such as a complementary metal-oxide-semiconductor (CMOS) sensor. The image sensor 115 may contain an array of picture elements (pixels) made up of photosensitive elements (e.g., photo-diodes, phototransistors, photo-gates, or the like), micro-lenses, and/or micro-electronic components (e.g., amplifying and switching components). The photosensitive elements may receive and convert electromagnetic energy (e.g., visible light) focused upon the elements (e.g., through a lens or other optics) into a digital signal (or an analog signal that is converted into a digital signal using an analog-to-digital converter (ADC)) that can be processed and/or stored by the image capture device 110.

The image sensor(s) 115 may also include a color filter array (CFA), composed of a mosaic of color filters (e.g., polymer filters), placed over the pixel array. Each color filter may reflect and/or absorb undesired color wavelengths such that each image sensor pixel is sensitive to a specific color wavelength. A Bayer filter, for example, may isolate red, green, and blue wavelengths using alternating red (R) and green (G) filters for odd rows and alternating green (G) and blue (B) filters for even rows. In other cases, a CFA can be made with complementary color filters such as cyan, magenta, and yellow, or any other color system. A full-color image (e.g., with intensities of all colors represented at each pixel) may be reconstructed from a captured image by performing a demosaicing algorithm (also known as, color reconstruction or CFA interpolation).

The image capture device 110 may also include one or more processor(s) 112 (e.g., a controller, digital signal processor (DSP), image signal processor (ISP), etc.) and one or more memory(ies) 114 (e.g., volatile or non-volatile memory(ies)). The processor(s) 112, memory(ies) 114, and image sensor(s) 115 may be coupled to and communicate over one or more communication bus(es) 111. The image capture device 110 may also include one or more communication interface(s) 116 coupled to communication bus(es) 111, which the processor(s) 112 can use to communicate with other devices, such as computing device 140. The image capture device 110, for example, may include a Camera Serial Interface (CSI), an Ethernet or Wi-Fi interface, and/or other communication interface over which data can be exchanged with other devices, such as computing device 140.

The processor(s) 112 may include processing logic 120 that can be used (e.g., executed by processor(s) 112) to perform different processes and/or operations. In some embodiments, the processing logic 120 may include image capture logic 121, which may be used to capture and store one or more image(s) using image sensor(s) 115, for example, as image data 102 on volatile and/or non-volatile memory(ies) 114. In some embodiments, processor(s) 112 may also include image processing logic 122, which may be used to process an image (e.g., as part of an image capture process performed by image capture logic 121, a post-capture image enhancement process, or some other process).

In some embodiments, for instance, processor(s) 112 may use image capture logic 121 to control image sensor(s) 115 (e.g., by exchanging control signaling over communication bus 111) and receive data output from the image sensor(s) 115 (e.g., over communication bus 111). In some embodiments, for example, image capture logic 121 may direct one or more image sensor(s) 115 to capture an image (e.g., of a physical scene illuminated by one or more illuminants), and in response, the image sensor(s) 115 may return data corresponding to the determined intensity of light (e.g., as measured by the photosensitive elements of the image sensor(s) 115). Image capture logic 121 may store the sensor data returned by image sensor(s) 115, for example, in volatile and/or non-volatile memory(ies) 114. In some embodiments, for example, image capture logic 121 may store raw sensor data (or raw image data) comprising one or more raw image(s) (e.g., as one or more raw image file(s)).

In some embodiments, image capture device 110 may process the raw image(s) further to produce captured image (s) that may be stored, in place of or in addition to the raw sensor data, as captured image data (e.g., as one or more captured image file(s)). In some embodiments, for example, image capture logic 121 may use image processing logic 122 to process the raw image(s) to produce captured image(s), which the image capture logic 121 may store in memory(ies) 114. In some embodiments, for example, image processing logic 122 may be used to process the raw image(s) to produce captured image file(s) that conform to a particular file format. In some embodiments, image processing logic 122 may also (or alternatively) be used to modify or enhance the raw image(s) in some way to produce the captured image(s). By way of example, in some embodiments, image processing logic 122 may be used to perform a demosaicing process to convert raw image(s) into full-color image(s). In some embodiments, the raw image(s) may not be processed further by image capture device 110 (e.g., before they are provided to computing device 140).

In at least one embodiment, the image capture device 110 may include one or more sensors (not illustrated) that can capture environmental data. For example, the image capture device 110 may be equipped with one or more temperature sensors (e.g., a thermocouple, a resistance temperature detector, a thermistor, etc.) to capture temperature data 103 associated with an operating environment of the image capture device 110. In at least one embodiment, the image capture logic 121 may be used to capture (e.g., via the one or more temperature sensors) and store temperature data 103 on volatile and/or non-volatile memory(ies) 114 in association with image data 102. In at least one embodiment, temperature data 103 may be measured via an image sensor external to the image capture device 110, recorded separately, and correlated with image data 102.

Depending on the embodiment, image data 102 may be or include raw sensor data and/or captured image data, comprising one or more raw image file(s) and/or captured image file(s). Each image file (e.g., raw image file or captured image file) may include a set of pixels forming an image (e.g., a raw image or captured image). Each image may have a size (e.g., reflecting a resolution of the image) that may be measured in terms of a quantity of pixels. An image, for example, may have a resolution expressed in terms of a width and height of pixels, for example, 720×480 (e.g., Standard-Definition (SD)), 1920×1800 (e.g., High Definition (HD)), 3840×2160 (e.g., 4K Ultra High Definition (4K UHD)), 7680×4320 (e.g., 8K Ultra High Definition (8K UHD)). In some embodiments, one or both of processing logic 120 and processing logic 150 may process or analyze the image data in pixel blocks. Pixel blocks are subset of adjacent pixels of set of pixels that form the image. In some instances, the image can be divided into contiguous subsets of pixels that are analyzed together as a unit during demosaicing, filter, color correction, noise estimation, noise reduction, compression, and/or decompression. For example, processing logic 120 and/or processing logic 150 may divide two images depicting a same scene into 4×4, 8×8, 16×16, etc. pixel blocks to perform noise estimation across varying intensity levels associated with the pixel blocks. It can be noted that the term "pixel blocks" is used herein by way of convenience, and not by way of limitation. While "pixel blocks" may imply a block-like arrangement of pixels, the term can more generally refer to a subset of pixels of contiguous pixels without a requirement for the subset of pixels to be arranged in a square or rectangular block. For example, methodologies described herein may operate using non-uniform pixel blocks that may fail to align with a block grid.

In some embodiments, an image file may also contain metadata regarding an image and its capture. The metadata, for example, may include details about the image (e.g., resolution, color space, etc.), about image capture device 110 and its settings when the image(s) were captured (e.g., make and model, orientation, aperture, shutter speed, focal length, metering mode, and ISO speed), and/or other relevant information (e.g., date, time, and/or location of capture). In at least one embodiment, the metadata may include temperature data 103 associated with the image file.

An image file may conform to a particular file format, which may define the information conveyed for each pixel of the image, including for example, the number and type of values conveyed for each pixel (e.g., raw pixel sensor values, RGB or YUV values, etc.) and corresponding value size (e.g., 8-bit, 10-bit, etc.) indicating the range that a particular value can take (e.g., 0-255, 0-1023, etc.). An image, for example, may be stored in a "RAW" format (e.g., RAW8, RAW16, etc.) where each image pixel contains the raw sensor output of a corresponding sensor pixel (e.g., of an image sensor 115) that may be represented by a particular number of bits (e.g., 8-bit, 16-bit, 24-bit, etc.). As another example, an image may be stored in an "RGB" format (e.g., RGB24 (or RGB 8:8:8), RGB48 (or RGB 16:16:16), etc.) where each image pixel has an associated red (R), green (G), and blue (B) value, each of which may be represented by a particular number of bits (e.g., 8-bits, 16-bits, etc.).

In some embodiments, image capture logic 121 may use image processing logic 122 to process raw sensor data (e.g., a raw image) to produce an image that conforms to a particular format (e.g., an RGB24 image). In some cases, this may involve reconstructing a full-color image (e.g., where each image pixel comprises an R, G, and B value) from a raw image (e.g., where each image pixel comprises a single value of a corresponding sensor pixel). Metadata associated with a raw image, for example, may indicate the color filter array (CFA) (e.g., a Bayer filter, CYGM filter, etc.) that was used to capture the raw image, which image processing logic 122 can use to determine the color conveyed by a specific sensor pixel. With this information, the image processing logic 122 may be able to perform a demosaicing algorithm to reconstruct a full-color image, which can be stored in the desired file format. The image, for instance, may be stored as an RGB image, where each pixel has an associated red (R), green (G), and blue (B) value (e.g., an RGB24 image (or RGB 8:8:8 image) where each color is represented by 8-bits of data). As another example, in some embodiments, image processing logic 122 may be used to convert an image from one color model or domain to another (e.g., an RGB model to a YUV model). By way of example, image capture logic 122 may convert an RGB image, where pixel color is represented by red (R), green (G), and blue (B) component values, to a YUV image, where pixel color is represented by a luma component (Y) and a pair of chromaticity components (U and V), reflecting a relative redness and relative blueness of the pixel.

The computing device 140 may include one or more processor(s) 142 (e.g., a digital signal processor (DSP), image signal processor (ISP) etc.), memory(ies) 144 (e.g., volatile or non-volatile memory), and a communication interface(s) 146. The processor(s) 142, memory(ies) 144, and communication interface(s) 146 may be coupled to and communicate over communication bus(es) 141. The processor(s) 142 can use communication interface(s) 146 to communicate with other devices such as image capture device 110. The computing device 140, for example, may include a Camera Serial Interface (CSI), an Ethernet or Wi-Fi interface, and/or other communication interface over which data can be exchanged with other devices, such as computing device 140. The processor(s) 142 may include processing logic 150 that can be used (e.g., executed by processor(s) 142) to perform different processes and/or operations. In some embodiments, for example, the processor(s) 142 may include image capture logic 151 and image processing logic 152, which are discussed in further detail herein.

The image capture logic 151 may be used by the processor (s) 142 of the computing device 140 to capture image data from an image source such as image capture device 110. The image capture logic 151, for example, may be used to acquire image data 102 and temperature data 103 from the image capture device 110 via communication interface(s) 146, which may be stored in volatile and/or non-volatile memory(ies) 144 for further processing. In some embodiments, computing device 140 may externally manage the image capture device 110 and control operation thereof. In some embodiments, for example, image capture logic 151 may initiate an image capture process on image capture device 110 (e.g., by exchanging control signaling with image capture device 110 over communication interface(s) 146) and may receive image data from image capture device 110 in response (e.g., via communication interface(s) 146).

Depending on the embodiment, image data 102 may be or include sensor data and/or captured image data, comprising one or more raw image file(s) and/or captured image file(s).

Each image file (e.g., raw image file or captured image file) may comprise a set of pixels forming an image (e.g., a raw image or captured image). Each image may have a size (e.g., reflecting a resolution of the image) that may be measured in terms of a quantity of pixels. Image data 102, for example, may include an image having a resolution expressed in terms of a width and height of pixels, for example, 720×480 (e.g., Standard-Definition (SD)), 1920×1800 (e.g., High Definition (HD)), 3840×2160 (e.g., 4K Ultra High Definition (4K UHD)), 7680×4320 (e.g., 8K Ultra High Definition (8K UHD)). In some embodiments, an image may also contain metadata regarding the image and its capture. The metadata, for example, may include details about the image (e.g., resolution, color space, etc.), about image capture device 110 and its settings when the image(s) were captured (e.g., make and model, orientation, aperture, shutter speed, focal length, metering mode, and/or ISO speed), and/or other relevant information (e.g., date, time, and/or location of capture).

In at least one embodiment, the processing logic 152 may include an image data analyzer 153. The image data analyzer 153 may automatically measure and/or update a noise profile 104 associated with the image sensor 115. In an illustrative example, the noise profile 104 may include multiple noise estimates across a dynamic range of the image sensor 115, as illustrated below with respect to FIG. 3. The dynamic range of the image sensor 115 is the range of signal intensities that the image sensor 115 can accurately capture. The noise profile 104 can provide insights regarding how noise characteristics change with differing intensity levels. In at least one embodiment, one or more noise reductions processes and/or algorithms associated with the image processing logic 152 may reduce noise present within the image data 102 based on the noise profile 104.

In at least one embodiment, the image data analyzer 153 may generate/update the noise profile 104 based one or more noise estimates associated with the image data 102. The data analyzer 153 may estimate noise based on the differences between images captured by the image sensor 115 that depict a same scene. Multiple images may depict the same scene such that the visual information captured by the image sensor 115 is identical or very similar. For example, multiple images captured by the image sensor 115 may contain similar or nearly identical content in scenes with little or no motion present. In another example, multiple images capture while the image sensor 115 is in a motionless state such that there is little or no change within the scene across the multiple images.

The image data analyzer 153 may identify a first and second image captured by the image sensor that depict the same scene. In at least one embodiment, the image data analyzer 153 may determine that the first and the second image depict a same scene based on an indication received from an external system or another component of the same system. For example, the imaging system 100 may be a sub-system within an automated driving system (ADS) or an advance drive assistance system (ADAS). The ADS/ADAS may include an Engine Control Unit (ECU) and/or Transmission Control Unit (TCU) that can provide an indication to the imaging system 100 that the vehicle is in a motionless state. The image data analyzer 153 may receive such an indication and accordingly determine that the images captured by the image sensor 115 while the vehicle is stationary depict or likely depict the same scene. The ECU and/or the TCU can receive signals from one or more sensors that indicate the vehicle is stationary. For example, the vehicle may include an anti-locking braking system (ABS) that uses one or more wheel speed sensors to the monitor the speed of each wheel of the vehicle. The ECU can receive signals from the ABS indicating the speed of the vehicle. In another example, the vehicle may include one or more transmission sensors that monitor the status of the transmission, including whether it is in gear or in a park position. The TCU can receive signals form the one or more transmission sensors indicating when the transmission is in "park." In at least one embodiment, the image data analyzer 153 may determine that the first and the second image depict the same scene based on one or more image signal processing techniques, as described in detail below with respect to FIG. 2.

In at least one embodiment, responsive to identification of the first image and second image depicting the same scene, the image data analyzer 153 can determine a difference between pixels of a first image and a second image to obtain a noise estimate. Because the subsequent frames/images depict the same scene, the pixel differences between the two images/frames indicate an amount of noise associated with the image sensor. To determine the differences between the first and second images, the image data analyzer 153 can subtract corresponding pixel values between the two images. In some embodiments, the ISP pipeline can perform the subtraction operation based on pixel blocks. For example, the first and second images can respectively be composed of corresponding N×M (e.g., 4×4, 8×8, 16×16, etc.) blocks of pixels. A difference between corresponding blocks of pixels can indicate an estimated noise level associated with the pixel block.

In some embodiments, noise estimates of pixel block differences can be associated with a corresponding intensity level in the static scene to obtain a noise profile of the image sensor at intensity levels across the dynamic range of the sensor. Pixels (e.g., pixel blocks) in an image can exhibit different intensity levels indicating an amount of brightness present in the pixel block. The ISP pipeline can compute average values of pixel intensities within pixel blocks. The computed average intensity level can be associated with a corresponding noise estimate to obtain a relationship between the estimated noise at the computed average intensity level. The relationship can be included within a noise profile of the sensor. The noise profile of the sensor can be periodically or continuously updated as images are captured by the sensor. Over time, the noise profile can represent the entire dynamic range of the sensor as it is updated using images that include varying degrees of intensity levels. Additionally, because the noise profile is updated continually (e.g., in real time), the noise profile may capture changes due to ambient temperature variation, sensor degradation, and the like.

It will be appreciated that the embodiments illustrated in FIG. 1 and described above are merely illustrative and that those of skill in the art will understand and appreciate that additional and alternative embodiments are possible. For example, while illustrated and described as separate components, in some embodiments, the image capture device 110 and computing device 140 may be combined. As another example, in some embodiments, processor(s) 112 may include at least a portion of the processing logic 150 of processor(s) 142 and may be configured to perform the functionality described herein with respect thereto.

Figure 2:
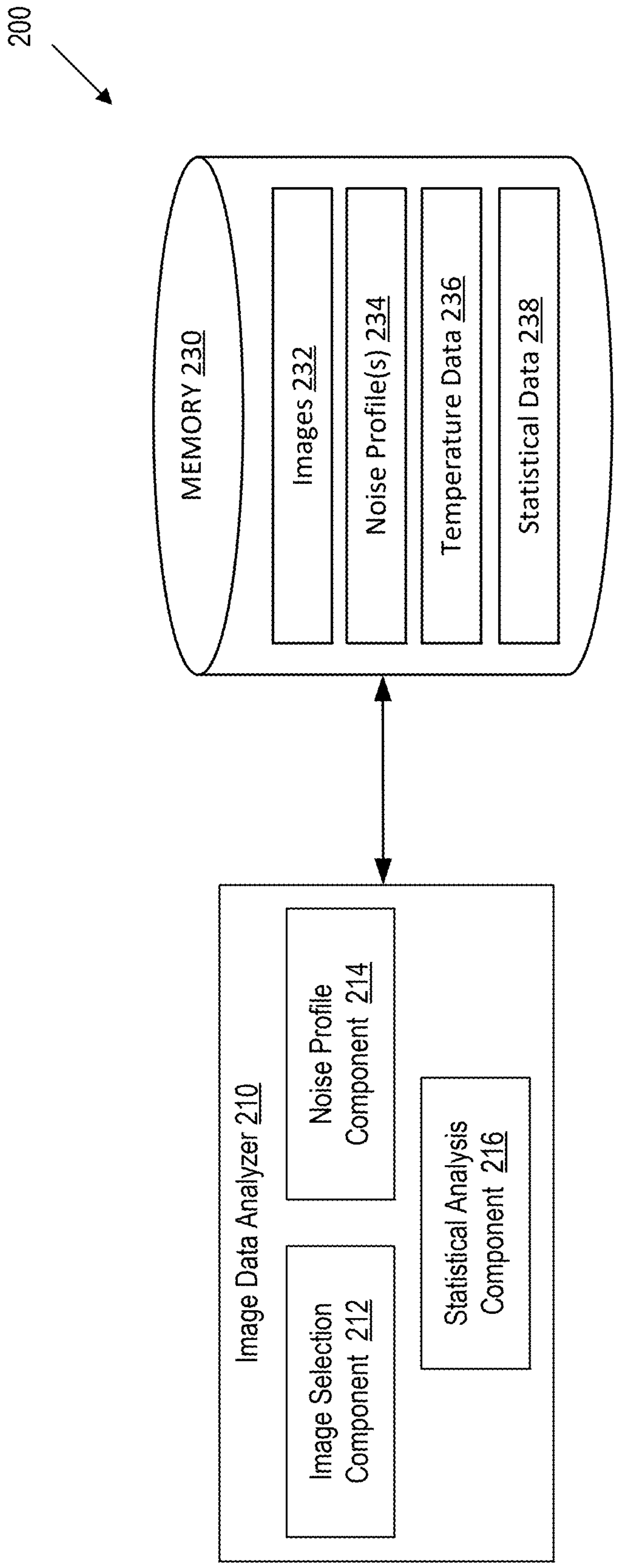
FIG. 2 is a block diagram illustrating an example image data analyzer for determining noise profiles, in accordance with at least one embodiment of the present disclosure.

FIG. 2 is a block diagram 200 illustrating an example image data analyzer 210 for determining noise profiles, in accordance with at least one embodiment of the present disclosure. In some embodiments, the image data analyzer 210 can include an image selection component 212, a noise profile component 214, and a statistical analysis component 216. In some embodiments, image data analyzer 210 can correspond to image data analyzer 153 associated with system 100. In some embodiments, the image data analyzer 210 can be connected to a memory 230 (e.g., via a network, via a communication bus 141, etc.). In some embodiments, one or more portions of the memory 230 can correspond to a memory 144 and/or another memory associated with the system 100.

As indicated above, the image data analyzer 210 may automatically measure and/or update a noise profile (e.g., noise profile 104) associated with an image sensor (e.g., image sensor 115). In some embodiments, the image data analyzer 210 may include an image selection component 212. The image selection component 212 may identify multiple images 232 captured by the image sensor to be analyzed by the image data analyzer 210. The image 232 captured by the image sensor may be stored (e.g., as image data) on volatile and/or non-volatile memory(ies) 230. In some embodiments, the images 232 may be multiple images that depict a same scene. Accordingly, the visual content or the subject matter captured in the images 232 may represent the identical real-word scene. In some embodiments, the images 232 may demonstrate content similarity such that objects, people, structures, and other elements within the scene remain consistent between the multiple images. For example, the images 232 may depict a road with the same vehicles, street lights, and traffic signs. In some embodiments, the multiple images may exhibit spatial alignment such that the relative position, arrangement, and location of the elements captured by each of the multiple images match. For example, the position, arrangement, and location of the vehicles, street lights, traffic signs, etc. may be aligned between the images 232.

In some embodiments, the image selection component 212 may identify the images 232 that depict the same scene based on a comparison of the images. For example, if the images 232 differ by less than a threshold, then it may be determined that the images are of a same scene.

In some embodiments, the image selection component 212 may identify the images 232 that depict the same scene based on an indication received from an external system that image sensor is in a motionless state. For example, the image data analyzer may be associated with the ADS/ADAS. The ADS/ADAS may include an ECU and/or TCU that can provide an indication to the vehicle associated with the ADS/ADAS is in a motionless state. Based on the received indication, the image selection component may determine that the multiple images captured by the image sensor while the vehicle was motionless depict or likely depict the same scene, as described above. The image selection component 212 may receive signals from one or more other sensors that indicate that the image sensor is in a motionless state, and accordingly infer that the multiple images depict the same scene.

In some embodiments, the image selection component 212 may identify the images 232 that depict the same scene based one or more image signal processing and/or computer vision techniques. In some embodiments, the one or more image processing techniques may include feature extraction and feature matching algorithm to identify distinctive features in the images 232 and match the corresponding distinctive features between the images 232. In some embodiments, the image selection component may leverage image differences techniques to highlight difference between images 232 captured by the image sensor. For example, the image selection component 212 may subtract pixels values of one image 232 from corresponding pixels values of another image, resulting in a pixel displacement image that emphasizes regions in which the two images differ. Thresholding techniques can be applied to the pixel displacement image to determine whether the two images depict the same scene. For example, responsive to determining that the variation between the two images indicated by the pixel displacement image is less than a threshold amount of pixel displacement, the image selection component 212 may determine that the two images depict the same or a substantially similar scene. Image differencing can be applied to consecutive images captured by the image sensor to determine whether the consecutive images depict the same scene.

In some embodiments, the image selection component 212 may use optical flow motion vectors to automatically determine whether one or more images depict the same scene. Optical flow refers to the pattern of apparent motion of objects in a captured scene resulting from relative motion between the observer and the scene. Optical flow motion vectors are vectors that represent the displacement of pixels or features between consecutive frames in sequence of images or video frames. The image selection component 212 can use these vectors to determine whether consecutive frames or images depict the same scene.

In some embodiments, the noise profile component 214 may receive images 232 identified by the image selection component 212 and determine noise estimates based on differences between the received images 232. For example, the noise profile component 214 may receive a first image and a second image that depict the same scene as identified by the image selection component 212. In at least one embodiment, responsive to identification of the first image and second image depicting the same scene, the image data analyzer 153 can determine a difference between pixels of a first image and a second image to obtain a noise estimate. Because the first image and the second image depict the same scene, the pixel differences between the two images/frames indicate an amount of noise associated with the image sensor at the moment in time the first and second images were captured.

To determine the differences between the first and second images, the noise profile component 214 can subtract (and/or perform another comparison operation with respect to)

corresponding pixel values between the two images. In some embodiments, the ISP pipeline can perform the subtraction operation based on pixel blocks. For example, the first and second images can respectively be composed of corresponding 16×16 blocks of pixels. A difference between corresponding blocks of pixel can indicate an estimated noise level associated with the pixel block. The pixel difference between the first image and the second image can manifest random fluctuations or variations that do not correspond to changes in the scene as the first image and the second image depict the same scene.

In some embodiments, when calculating the pixel difference between the first and second images, the noise profile component 214 can performing the differencing operation independently on each color channel. For example, the first and second images may be stored in the memory 230 in an "RGB" format (e.g., RGB24 (or RGB 8:8:8), RGB48 (or RGB 16:16:16), etc.) where each image pixel has an associated red (R), green (G), and blue (B) value, each of which may be represented by a particular number of bits (e.g., 8-bits, 16-bits, etc.). For each corresponding pixel block in the first and second images, the noise profile component 214 may subtract pixel values of the first image from pixel values of the second image separately for each color channel. It is appreciated that the noise profile component 214 perform pixel differencing on indusial color channels of various color models such as RGB; red (R), yellow (y), cyan (Cy) (RYCy); luminance (L), green-red (A), blue-yellow (B) LAB; cyan (C), magenta (M), yellow (Y) (CMY); and the like. In some embodiments, noise estimates of pixel block differences can be associated with a corresponding intensity level in the static scene to obtain a noise profile of the image sensor at intensity levels across the dynamic range of the sensor. Pixels (e.g., pixel blocks) in an image can exhibit different intensity levels indicating an amount of brightness present in the pixel block. The noise profile component 214 can compute an average of pixel intensities within a pixel block to determine the average intensity level present in the pixel block. Where the image contains multiple color channels (e.g., RGB, RYCy, LAB, CMY, etc.) the noise profile component may calculate average pixel intensity value for each color component (e.g., an average R, average G, average B intensity value for an RGB image). The noise profile component 214 can compute the average using an arithmetic mean, a geometric mean, a median, and/or the like. In an illustrative example, the noise profile component 214 can compute the average intensity value of pixel blocks according to the equation (1), where $\bar{I}$ is the average intensity of the pixel block, $I_i$ is the intensity of $i^{th}$ in the pixel block, and n is the total number of pixels in the block.

$$\bar{I} = \frac{\sum_{i=1}^{n} I_i}{n} \quad (1)$$

The computed average intensity level, $\bar{I}$, can be associated with a corresponding noise estimate to obtain a relationship between the estimated noise at the computed average intensity level. The relationship can be included within a noise profile 234 stored within the memory 230. The noise profile 234 can be periodically or continuously updated as images are captured by the sensor and analyzed by the noise profile component 214. Over time, the noise profile can represent the entire dynamic range of the sensor as it is updated using images that include varying degrees of intensity levels, as illustrated below with respect to FIG. 3.

In some embodiments, the noise profile component 214 may periodically generate a new noise profile. In some embodiments, as contents or lighting within a scene captured by the sensor change, the noise profile component 214 can cease generating noise estimates until the scene in the camera's view stabilizes again and noise measurements may resume for a new distribution of intensities. In some embodiments, the noise profile component 214 may generate a noise profile on an hourly, daily, monthly, yearly, etc. basis. Accordingly, the noise profiles 234 can include a set of historical noise profiles associated with the sensor operating under a variety of conditions within a variety of environments.

In some embodiments, the image data analyzer 210 can include a statistical analysis component 216 to analyze one or more noise profiles 234 and produce statistical data 238 based on noise estimates, intensity, and conditions associated with the image sensor. Conditions associated with the image sensor can generally include environment and operational factors associated that can affect noise estimates of images captured by the image sensor. The statistical analysis component 216 may generate a table of noise versus intensity and other conditions internal to the ISP pipeline. The statistical analysis component 216 may further update the table on a time-segmented basis to examine changes in noise performance of the sensor over time (e.g., hourly, weekly, yearly, etc.) warning of changing conditions, such as sensor performance degradation, over time.

In some embodiments, the conditions can include temperature data 236 measured from one or more temperature sensors and stored within the memory 230. Temperature is a factor that can influence a level of noise in an image captured by an image sensor. For example, as the temperature of the image sensor increases, the thermal energy within the sensor also increases. This can lead to an increase in thermal or dark current, which is the generation of electrons within the image sensor. Dark current can contribute to noise in an image, especially in high temperature environments. In another example, readout noise can be affected by temperature. Readout noise is introduced during the process of reading the charge accumulated in the pixels of the image sensor. Increased temperatures can lead to increased electronic noise during the readout process, affecting the signal-to-noise ratio of the images captured by the image sensor.

The image data analyzer 210 can track the correlations/relationships between temperature and sensor noise as temperature data 236 fluctuates and a corresponding noise profile 234 changes. The statistical data 238 can include a record of historical noise profiles 234 associated with various temperature data 236. For example, the sensor may be associated with a first noise profile while operating within an ambient temperature of 100° Fahrenheit and a second, different, noise profile while operating within and ambient temperature of 20° Fahrenheit.

In some embodiments, the image signal processing pipeline (ISP) of the sensor may apply one or more noise reduction algorithms to images captured by the image sensor based on associated noise profiles 234. For example, the ISP may apply a first noise reduction algorithm to an image captured by the sensor operating in an environment with a first ambient temperature (e.g., 100° Fahrenheit) and apply a second noise reduction algorithm to an image captured by the sensor operating to an environment with a second ambient temperature of (32° Fahrenheit). In some embodiments, the ISP may employ an adaptive noise reduction algorithm that automatically adjusts noise correction parameters according to temperature data 236 and associated noise profiles 234. In some embodiments, the ISP may generally adjust the adaptive noise reduction algorithm to automatically adjust noise correction parameters based on one or more operational and/or environment conditions associated with the sensor and included in the statistical data 238.

In some embodiments, a condition included in the statistical data 238 tracked by the statistical analysis component 216 can include sensor gain. Sensor gain (e.g., analog gain, digital gain) refers to the amplifications applied to a signal generated by an image sensor before or after the signal is digitized. Sensor gain is a factor that affects the overall intensity of images captured by the sensor. In some instances, sensor gain can be adjusted by control exposure, for example, in low low-light conditions. While increasing gain can brighten an image, it can also amplify noise, thereby decreasing image quality. As such, the statistical analysis component 216 can analyze can maintain a record of noise profiles 234 and corresponding gain.

In some embodiments, operating conditions can include various parameters associated with the image sensor and on-board electronics that may create electromagnetic interferences that can affect the image sensor and cause noise to manifest at the output of the image sensor. For example, a radio or other on-board component in close proximity to the image sensor may produce electromagnetic interference that impacts signals read out from the image sensor, thereby affecting image sensor noise.

In some instances, degradation, failing components, and an aging image sensor can be conditions that potentially affect noise characteristics and noise profiles associated with the image sensor. For example, over time, the image sensor may experience an increase in dark current, which can produce additional random signals and contribute to noise. In another example, readout noise, which occurs when the signal is read from the sensor, can be affected by failing/aging electronic components and circuitry, thereby contributing to overall noise associated with captured images. In some embodiments, statistical data 238 and noise profiles 234 can be updated on a time-segmented basis to determine changes in noise profiles 234 over time due to sensor degradation, failing components, and aging. For example, statistical data 238 and noise profiles 234 can be updated hourly, daily, weekly, yearly, etc. and historical records may be maintained to determine a status of the sensor as performance degrades over time. The statistical analysis component can determine sensor status and performance degradation based on how the noise profiles 234 and associated statistical data 238 change over time.

In some instances, noise characteristics can change based on the position and field of view (FoV) of an image sensor. For example, non-uniform temperature variations (spatial temperature variations) across the sensor can cause variations in pixel quality and nonuniformity across the sensors surface. In another example, imperfections in the sensor's silicon substrate, such as electron traps and defects can contribute to non-uniform noise. Such imperfections can affect charge transfer efficiency and introduce anomalies in specific region of a FoV of the image sensor. Different regions of the sensor may exhibit different noise characteristics for a multitude of additional reasons (e.g., lens degradation, color shading effects, etc.). In some embodiments, the statistical analysis component 216 can identify and track noise profiles 234 against the FoV of the image sensor. This can involve analyzing one or more noise profiles 234 to determine how noise estimates vary across different position or regions within the FoV of the image sensor. The statistical analysis component 216 can identify a status of certain areas that exhibit more noise than other areas and maintain records of such identifications as statistical data 238.

In some embodiments, the image data analyzer 210 can exploit existing image data to automatically generate noise profiles for various sensors in combination with lenses for various imaging conditions. For example, images 232 can included images captured by multiple image sensors and associated metadata. The metadata can include an identifier of the sensor used to capture the image and additional details (e.g., camera settings, date and time of capture, coordinates of capture, color profile, temperature data, etc.) associated with the sensor. The image data analyzer 210 can generate noise profiles for each sensor based on the corresponding stored images 232.

Figure 3:
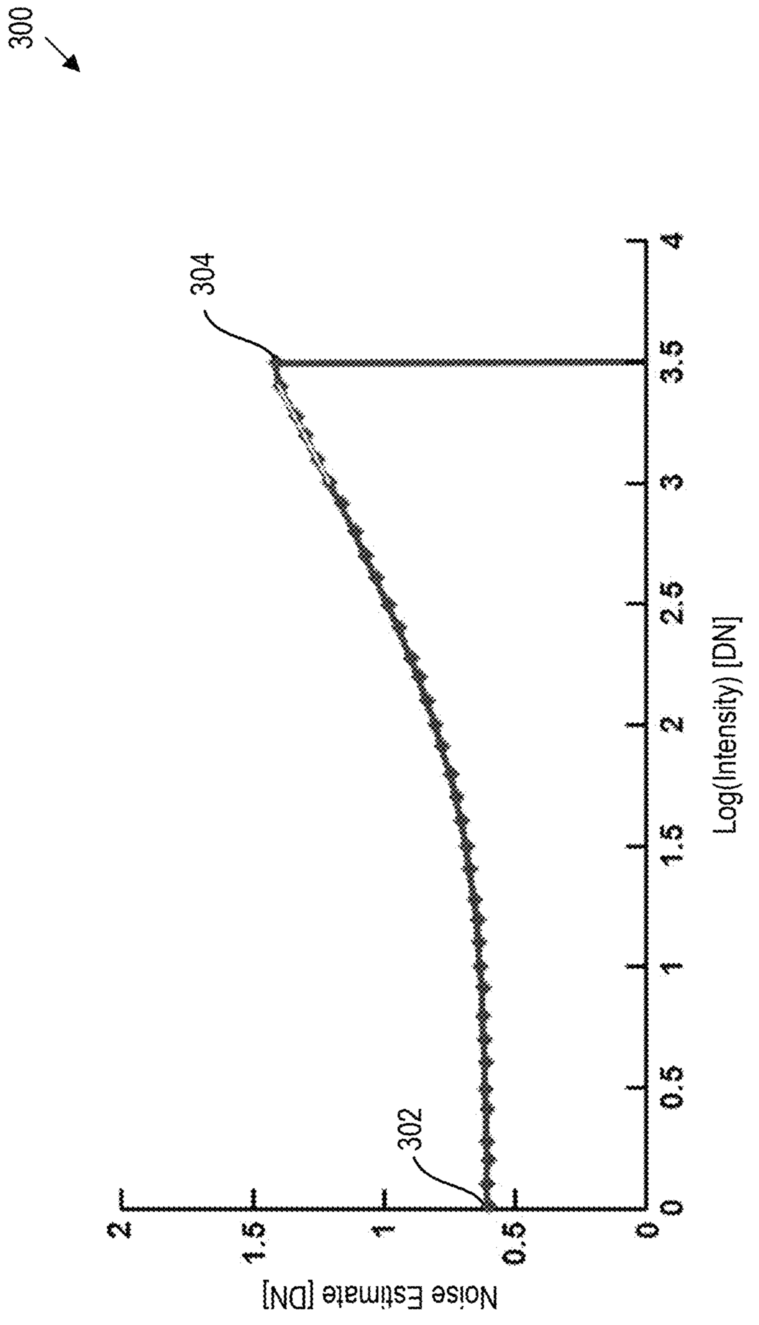
FIG. 3 illustrates an example graph of a single-exposure noise profile associated with an image sensor, in accordance with at least one embodiment of the present disclosure.

FIG. 3 illustrates an example graph 300 of a single-exposure noise profile associated with an image sensor, in accordance with at least one embodiment of the present disclosure. In the example graph 300, the horizontal axis (running from 0 to 4) is a logarithmic digital number (DN) representation of intensity values. The DN of intensity values is a numerical value assigned to each pixel or block of pixels based on image sensor measurements during the image acquisition process. In some embodiments, each coordinate on the graph 300 can be associated with an DN intensity value that is the average intensity value of a pixels within a pixel block, as calculated according to equation (1). In some embodiments, the horizontal axis can include the range (referred to as the "dynamic range" herein) of intensity vales the image sensor is able to capture. Accordingly, the dynamic range defines the span between the darkest and brightest levels of intensity that the sensor is able to distinguish.

The vertical axis (running from 0 to 2) is a DN representation of noise estimates. The DN of noise estimates is a numerical value associated with the difference between corresponding pixels or pixels blocks of images captured by the image sensor that depict the same scene. The coordinate 302 corresponds to a noise estimate at the darkest intensity level associated with the image sensor. For example, the coordinate 302 can correspond to a noise estimate of a scene captured while the lens of the image sensor is covered with an opaque object, such as a lens cap. The coordinate 304 corresponds to a noise estimate at the brightest intensity level associated with the image sensor. For example, the coordinate 304 can correspond to a noise estimate of a scene of an object illuminated by intense sunlight while the image sensor is operating outdoors. Accordingly, the graph 300 can represent noise estimates across a dynamic range of intensity levels associated with the image sensor.

Returning to FIG. 2, In some embodiments, the noise profile component 214 may generate one or more noise profiles 234 associated with the image sensor, as described herein. Over time, as the image sensor captures images in varying environments, the noise profile component 214 may build a noise profile 234 that includes noise estimates for each digital number representation of intensity levels captured using the image sensor. Rather than artificially replicating an operating environment of the image sensor to determine noise profiles prior to field deployment, the noise profile component 214 can dynamically (e.g., in real-time or near real-time) construct and update a noise profile 234 while the image sensor is deployed and performing its intended function in the field. Accordingly, the technique allows for noise profiles 234 to be evaluated at a higher tonal resolution that captures the entire dynamic range of the image sensor than can be achieved under artificial conditions. This allows noise holes and transitions associated with HDR imaging to be more accurately profile and located. Additionally, such improved estimation of noise profiles 234 can improve modulation and control of noise reduction algorithms and result in an associated improvement in image quality.

Figure 4A:
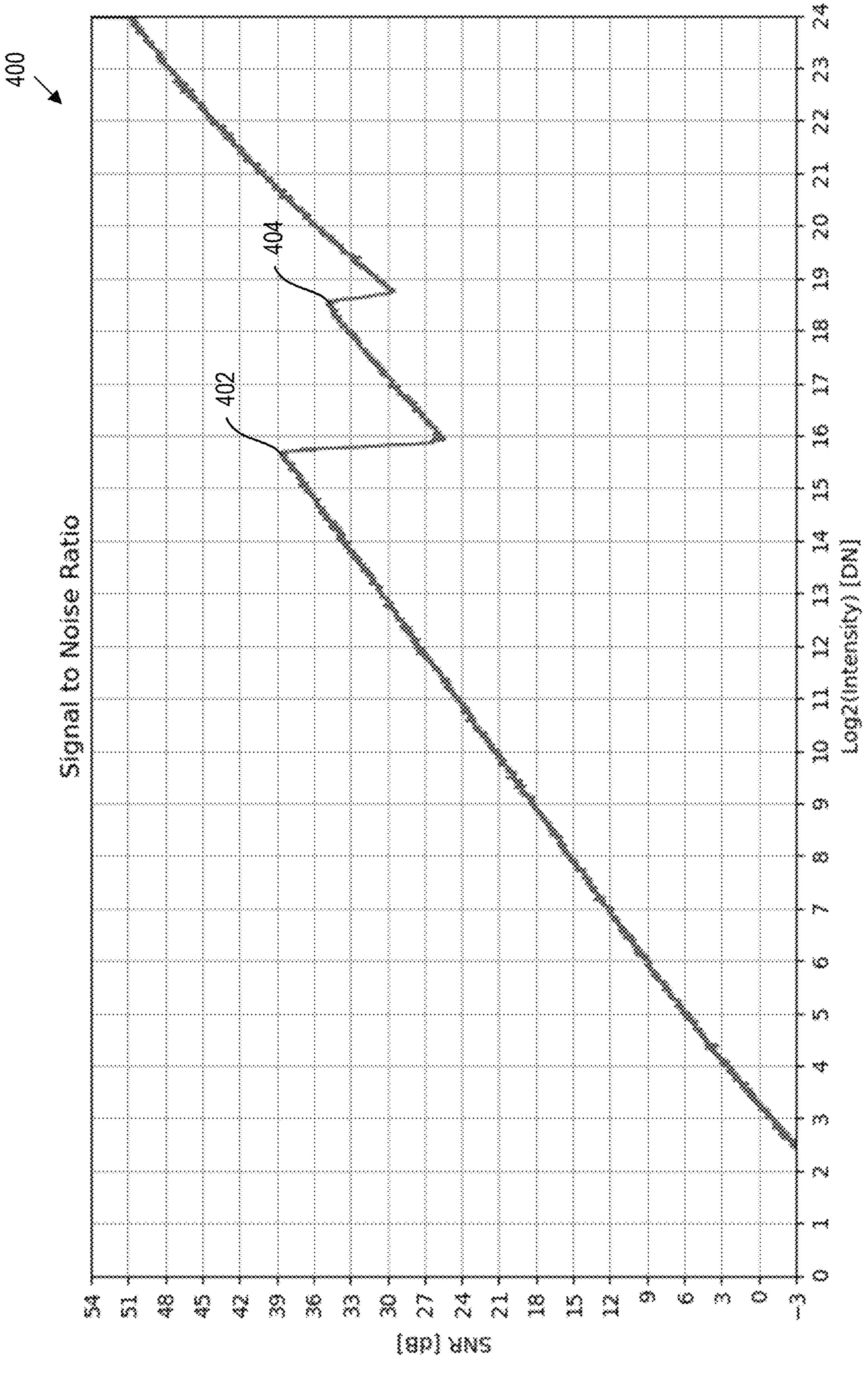
FIG. 4A is an example graph illustrating signal-to-noise ratio (SNR) discontinuities between exposure transition points for an example high dynamic range (HDR) sensor, in accordance with at least one embodiment of the present disclosure.

FIG. 4A illustrates an example graph 400 illustrating signal-to-noise ratio (SNR) discontinuities between exposure transition points for an example high dynamic range (HDR) sensor, in accordance with at least one embodiment of the present disclosure. In the example graph 400, the horizontal axis (running from −24 to 0) is a logarithmic digital number (DN) representation of intensity values. In some embodiments, each coordinate of the graph 400 can be associated with an DN intensity value that is the average intensity value of a pixels within a pixel block, as calculated according to equation (1). In some embodiments, the horizontal axis can include the dynamic range of intensity vales the image sensor is able to capture.

The vertical axis (running from −3 to 54) is an SNR that is a measure to quantify the strength of a signal to the level of estimated noise, expressed in decibels (dB). In some embodiments, the SNR can be calculated according to equation (2), where signal power represents the strength or magnitude of the desired signal and noise estimate represents the noise estimate associated with the scene, calculated according to the above-described techniques.

$$SNR(Db) = 10 * \log_{10}\left(\frac{\text{Signal Power}}{\text{Noise Estimate}}\right) \qquad (2)$$

Some sensors, such as HDR sensors, can exhibit exposure transition points. Exposure transition points refer to regions in an image captured by the HDR sensors in which image with varying exposure levels are combined. Depending on intensity levels present in the image, different regions of the image can be captured with different exposure levels. For example, in HDR imaging, multiple images may be captured at various exposure levels to capture details in both bright and dark regions of the image. In some instances, noise characteristics in images can vary at different exposure levels. For example, the graph 400 illustrates an exposure transition point 402 and an exposure transition point 404 and associated discontinuities among corresponding noise estimates. In some instances, the noise profile at and immediately surrounding transition points can change based on algorithms developed by a designer of the image sensor. For example, a certain image sensor can transition between exposure levels based on a static threshold. A first exposure level is applied to pixels below the static threshold and a second exposure level applied to pixels above the static threshold. Resultantly, immediate changes in noise estimates can occur between intensity levels, as illustrated by the transition points 402 and 404. In another example, a different image sensor may apply blending between exposure levels such that transition points are not as immediate compared to the static threshold method.

Figure 4B:
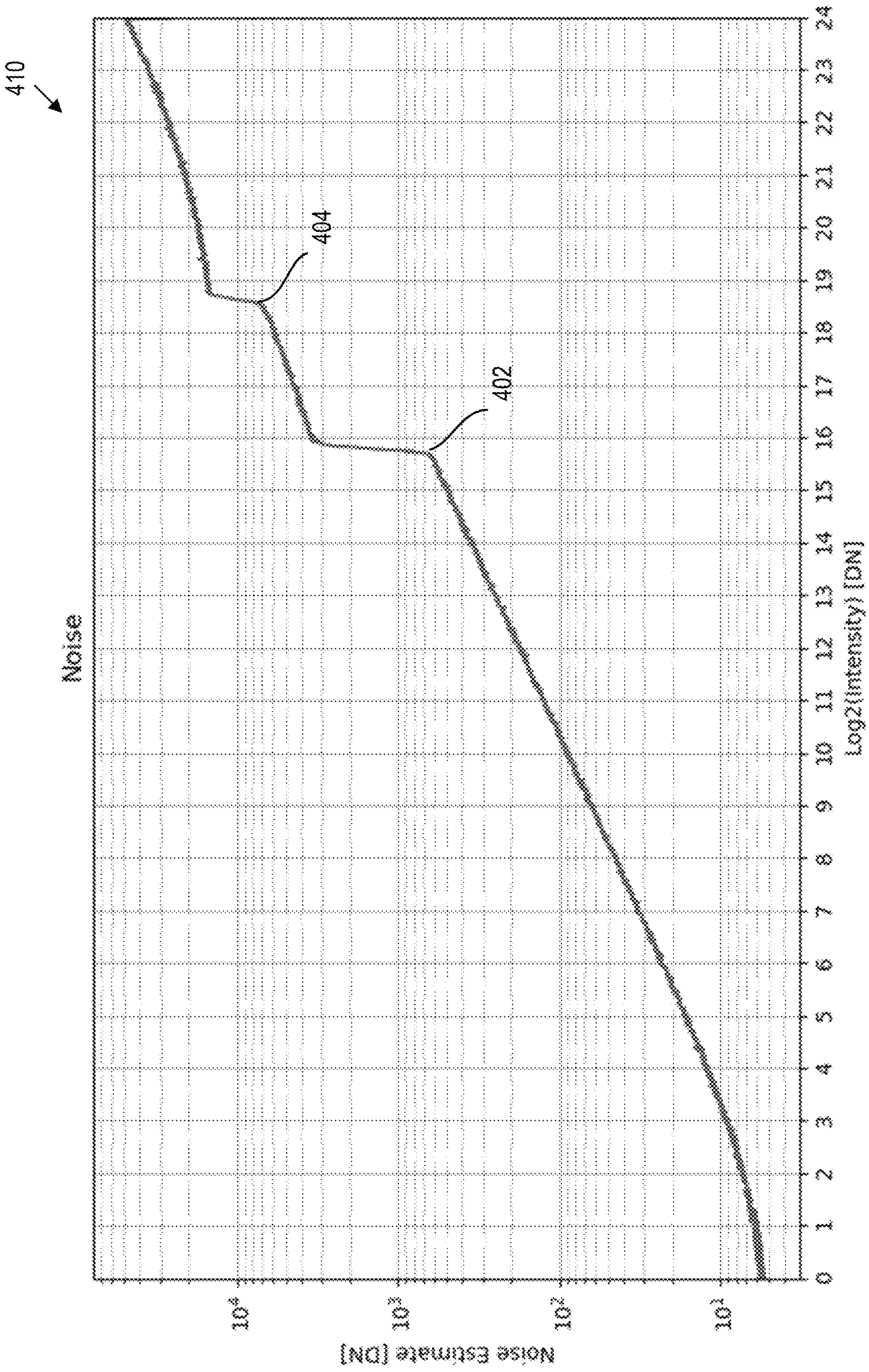
FIG. 4B is an example graph illustrating noise estimate discontinuities between exposure transition points for an example high dynamic range (HDR) sensor, in accordance with at least one embodiment of the present disclosure.

FIG. 4B is an example graph 410 illustrating noise estimate discontinuities between exposure transition points for an example high dynamic range (HDR) sensor, in accordance with at least one embodiment of the present disclosure. In the example graph 410, the horizontal axis (running from 0 to 24) is a logarithmic DN representation of intensity values. In some embodiments, each coordinate on the graph 410 can be associated with an DN intensity value that is the average intensity value of a pixels within a pixel block, as calculated according to equation (1). In some embodiments, the horizontal axis can include the dynamic range of intensity vales the HDR sensor is able to capture.

The vertical axis is a DN representation of noise estimates. The DN of noise estimates is a numerical value associated with the difference between corresponding pixels or pixels blocks of images captured by the image sensor that depict the same scene, as described above. The graph 410 includes the same exposure transition points 402 and 404 described above with respect to FIG. 4A.

Returning to FIG. 2, in some embodiments, the noise profile component 214 may generate one or more noise profiles 234 associated with the image sensor. However, due to differences in HDR sensor design, behavior of the noise profiles 234 around exposure transition points may vary based on the sensor. Over time, as the image sensor captures images with intensity levels around the exposure transition points, the noise profile component 214 may automatically build a noise profile 234 that accurately represents the senor. Accordingly, an accurate noise profile 234 can be determined without leveraging sensor design details related to exposure transition points.

Figure 5A:
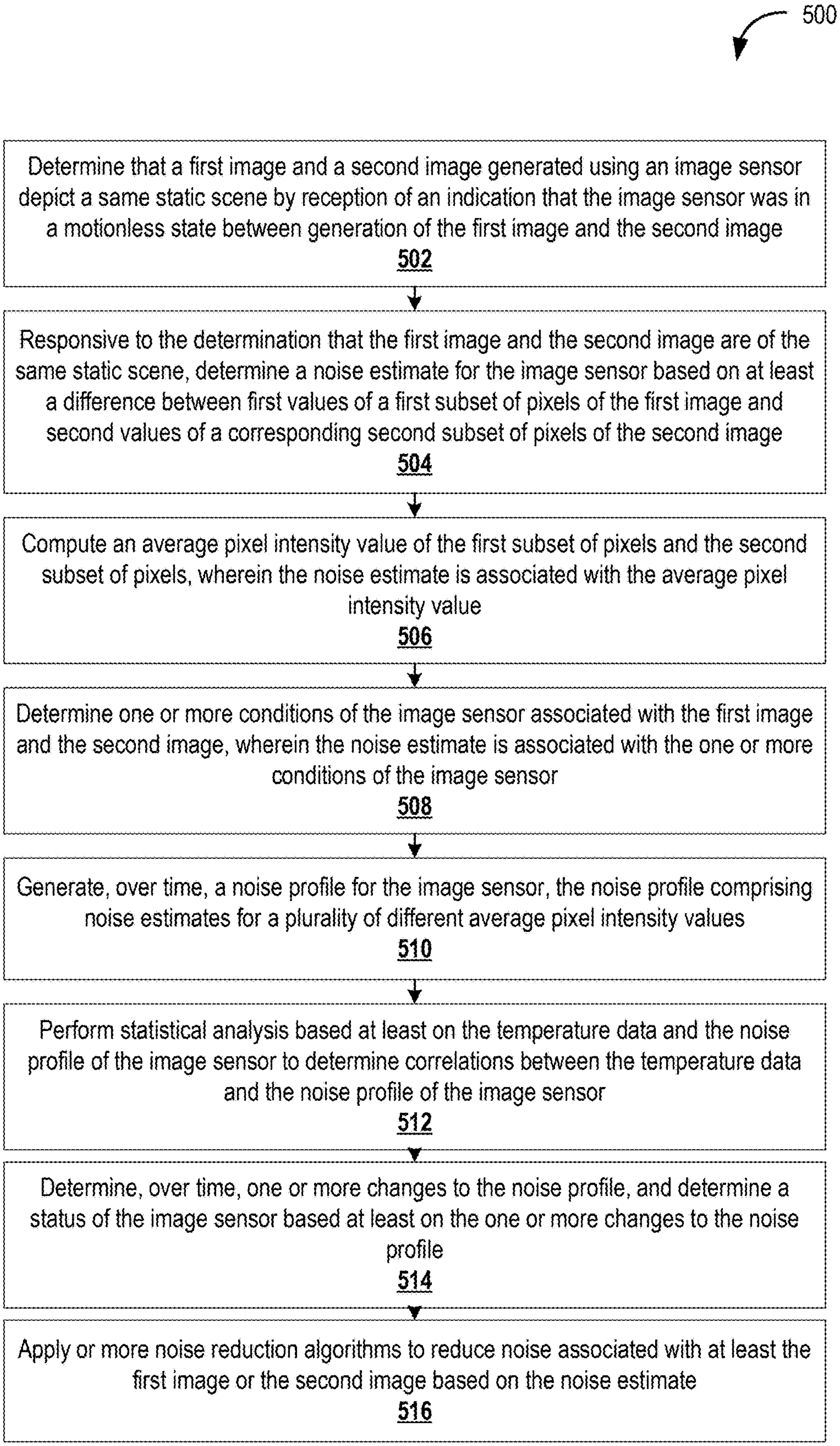
FIG. 5A illustrates a flow diagram of an example method of determining a noise profile for an image sensor based on image date, in accordance with at least one embodiment of the present disclosure.

FIG. 5A illustrates a flow diagram of an example method 500 of determining a noise profile for an image sensor based on image date, in accordance with at least one embodiment of the present disclosure. For the sake of simplicity and clarity, method 500 are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations. In some embodiments, the method 500 can be performed by processing logic of a computing device (e.g., using processor 142 of computing device 140 shown in FIG. 1).

At operation 502 of method 500, the processing logic can determine that a first image and a second image generated using an image sensor depict a same static scene. The processing logic can determine that the first image and the second images are images of a same static scene by reception of an indication that the image sensor was in a motionless state between generation of the first image and the second image. In some embodiments, the image sensor is a high dynamic range (HDR) sensor. In some embodiments, to determine that the first image and the second image generated by the image sensor are images of the same static scene, the processing logic can determine an amount of pixel displacement between the first image and the second image, and determine that the amount of pixel displacement is below a threshold amount of pixel displacement, as illustrated below with respect to FIG. 5B.

At operation 504 of method 500, responsive to a determination that the first image and the second image depict the same static scene, the processing logic can determine a noise estimate for the image sensor based at least on a difference between first values of a first subset of pixels of the first image and second values of a corresponding second subset of pixels of the second image.

At operation 506 of method 500, the processing logic can compute an average pixel intensity value of the first subset of pixels and the second subset of pixels, wherein the noise estimate is associated with the average pixel intensity value.

At operation 508 of method 500, the processing logic can determine one or more conditions of the image sensor associated with the first image and the second image, wherein the noise estimate is associated with the one or more conditions of the image sensor. In some embodiments, the one or more conditions of the image sensor include one or more temperatures as measured using one or more temperature sensors associated with the image sensor.

At operation 510 of method 500, the processing logic can generate, over time, a noise profile for the image sensor, the noise profile including noise estimates for different average pixel intensity values.

At operation 512 of method 500, the processing logic can perform statistical analysis based at least on the temperature data and the noise profile of the image sensor to determine correlations between the temperature data and the noise profile of the image sensor.

At operation 514 of method 500, the processing logic can determine, over time, one or more changes to the noise profile, and determine a status of the image sensor based at least on the one or more changes to the noise profile. In some embodiments, the status of the image sensor includes failure of one or more components associated with the image sensor.

At operation 516 of method 500, the processing logic can apply or more noise reduction algorithms to reduce noise associated with at least the first image or the second image based on the noise estimate.

In some embodiments, the operations of method 500 are performed while the image sensor is operating on a machine in an environment. For example, the operation of method 500 can be performed while the image sensor is integrated and used within a real-world automotive environment as part of an ADAS.

Figure 5B:
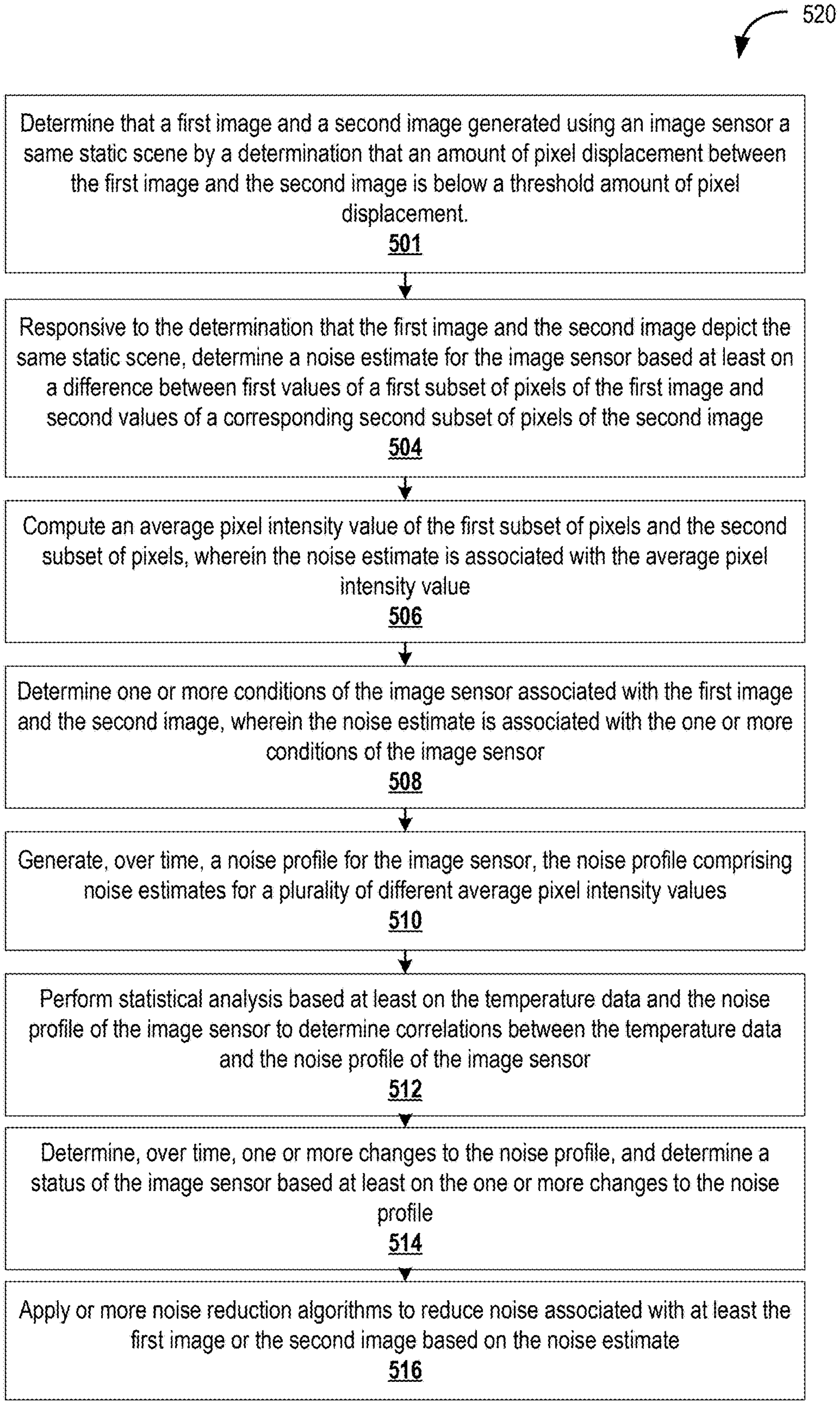
FIG. 5B illustrates a flow diagram of another example method 520 of determining a noise profile for an image sensor based on image date, in accordance with at least one embodiment of the present disclosure.

FIG. 5B illustrates a flow diagram of another example method 520 of determining a noise profile for an image sensor based on image date, in accordance with at least one embodiment of the present disclosure. For the sake of simplicity and clarity, method 500 are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations. In some embodiments, the method 500 can be performed by processing logic of a computing device (e.g., using processor 142 of computing device 140 shown in FIG. 1).

At operation 501 of method 520, the processing logic can determine that a first image and a second image generated using an image sensor depict a same static scene by a determination that an amount of pixel displacement between the first image and the second image is below a threshold amount of pixel displacement.

At operation 504 through operations 516, the processing logic can perform the same operations described above with respect to FIG. 5A.

Figure 6A:
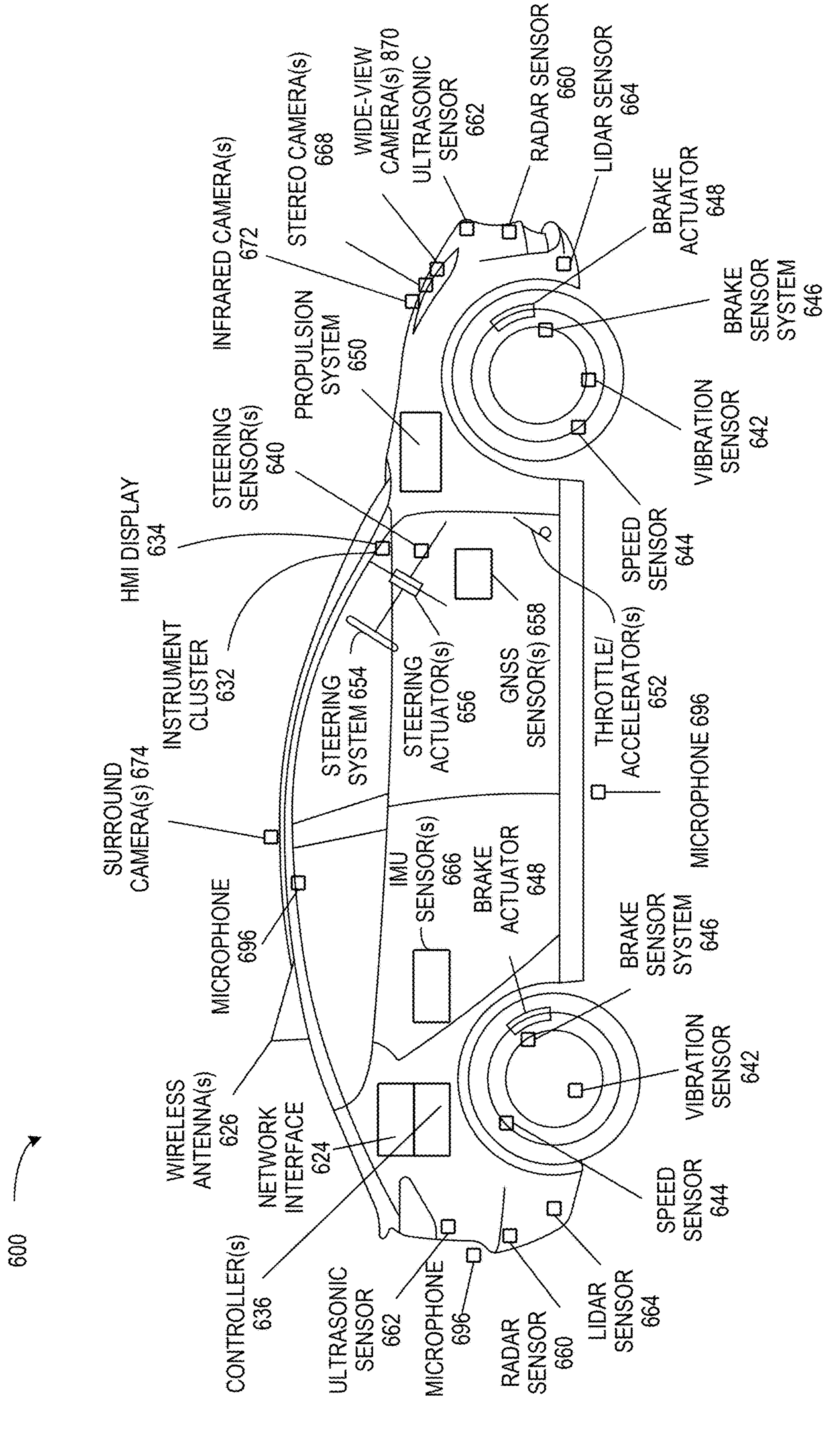
FIG. 6A illustrates an example of an autonomous vehicle, according to at least one embodiment.

FIG. 6A illustrates an example of an autonomous vehicle 600, according to at least one embodiment. In at least one embodiment, autonomous vehicle 600 (alternatively referred to herein as "vehicle 600") may be, without limitation, a passenger vehicle, such as a car, a truck, a bus, and/or another type of vehicle that accommodates one or more passengers. In at least one embodiment, vehicle 600 may be a semi-tractor-trailer truck used for hauling cargo. In at least one embodiment, vehicle 600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 600 may be capable of functionality in accordance with one or more of Level 1 through Level 5 of autonomous driving levels. For example, in at least one embodiment, vehicle 600 may be capable of conditional automation (Level 3), high automation (Level 4), and/or full automation (Level 5), depending on embodiment.

In at least one embodiment, vehicle 600 may include, without limitation, components such as a chassis, a vehicle body, wheels (e.g., 2, 4, 6, 8, 18, etc.), tires, axles, and other components of a vehicle. In at least one embodiment, vehicle 600 may include, without limitation, a propulsion system 650, such as an internal combustion engine, hybrid electric power plant, an all-electric engine, and/or another propulsion system type. In at least one embodiment, propulsion system 650 may be connected to a drive train of vehicle 600, which may include, without limitation, a transmission, to enable propulsion of vehicle 600. In at least one embodiment, propulsion system 650 may be controlled in response to receiving signals from a throttle/accelerator(s) 652.

In at least one embodiment, a steering system 654, which may include, without limitation, a steering wheel, is used to steer vehicle 600 (e.g., along a desired path or route) when propulsion system 650 is operating (e.g., when vehicle 600 is in motion). In at least one embodiment, steering system 654 may receive signals from steering actuator(s) 656. In at least one embodiment, a steering wheel may be optional for full automation (Level 5) functionality. In at least one embodiment, a brake sensor system 646 may be used to operate vehicle brakes in response to receiving signals from brake actuator(s) 648 and/or brake sensors.

In at least one embodiment, controller(s) 636, which may include, without limitation, one or more system on chips ("SoCs") (not shown in FIG. 6A) and/or graphics processing unit(s) ("GPU(s)"), provide signals (e.g., representative of commands) to one or more components and/or systems of vehicle 600. For instance, in at least one embodiment, controller(s) 636 may send signals to operate vehicle brakes via brake actuator(s) 648, to operate steering system 654 via steering actuator(s) 656, to operate propulsion system 650 via throttle/accelerator(s) 652. In at least one embodiment, controller(s) 636 may include one or more onboard (e.g., integrated) computing devices that process sensor signals, and output operation commands (e.g., signals representing commands) to enable autonomous driving and/or to assist a human driver in driving vehicle 600. In at least one embodiment, controller(s) 636 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 636 provide signals for controlling one or more components and/or systems of vehicle 600 in response to sensor data received from one or more sensors (e.g., sensor inputs). In at least one embodiment, sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit ("IMU") sensor(s) 666 (e.g., accelerometer(s), gyroscope(s), a magnetic compass or magnetic compasses, magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range cameras (not shown in FIG. 6A), mid-range camera(s) (not shown in FIG. 6A), speed sensor(s) 644 (e.g., for measuring speed of vehicle 600), vibration sensor(s) 642, steering sensor(s) 640, brake sensor(s) (e.g., as part of brake sensor system 446), and/or other sensor types.

In at least one embodiment, one or more of controller(s) 636 may receive inputs (e.g., represented by input data) from an instrument cluster 632 of vehicle 600 and provide outputs (e.g., represented by output data, display data, etc.) via a human-machine interface ("HMI") display 634, an audible annunciator, a loudspeaker, and/or via other components of vehicle 600. In at least one embodiment, outputs may include information such as vehicle velocity, speed, time, map data (e.g., a High Definition map (not shown in FIG. 6A), location data (e.g., vehicle's 600 location, such as on a map), direction, location of other vehicles (e.g., an occupancy grid), information about objects and status of objects as perceived by controller(s) 636, etc. For example, in at least one embodiment, HMI display 634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 600 further includes a network interface 624 which may use wireless antenna(s) 626 and/or modem(s) to communicate over one or more networks. For example, in at least one embodiment, network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the autonomous vehicle 600 of FIG. 6A for performing image processing operations, including white balancing operations.

Figure 6B:
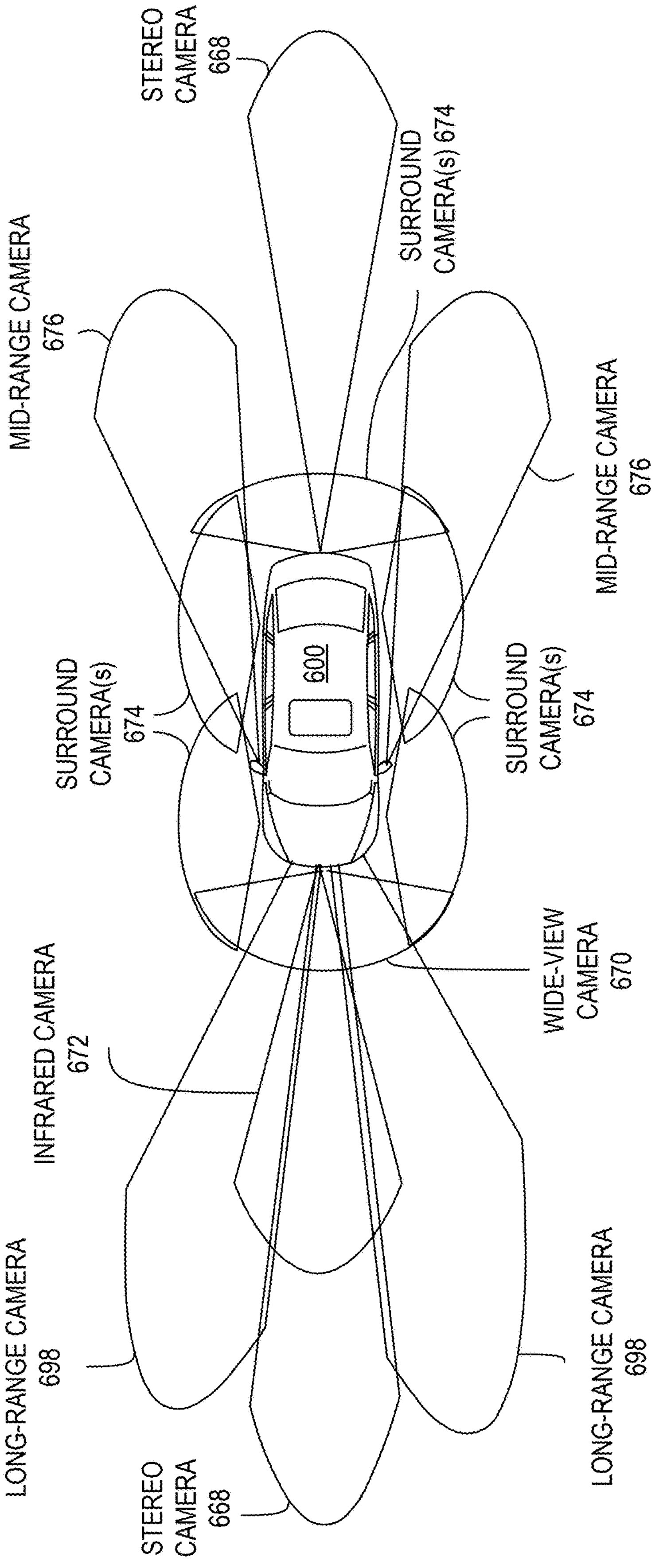
FIG. 6B illustrates an example of camera locations and fields of view for the autonomous vehicle of FIG. 6A, according to at least one embodiment.

FIG. 6B illustrates an example of camera locations and fields of view for autonomous vehicle 600 of FIG. 6A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 600.

In at least one embodiment, camera types for cameras may include, but are not limited to, digital cameras that may be adapted for use with components and/or systems of vehicle 600. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within vehicle 600 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 600 (e.g., front-facing cameras) may be used for surround view, to help identify forward facing paths and obstacles, as well as aid in, with help of one or more of controller(s) 636 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 670 may be used to perceive objects coming into view from a periphery (e.g., pedestrians, crossing traffic or bicycles). Although only one wide-view camera 670 is illustrated in FIG. 6B, in other embodiments, there may be any number (including zero) wide-view cameras on vehicle 600. In at least one embodiment, any number of long-range camera(s) 698 (e.g., a long-view stereo camera pair) may be used for depth-based object detection, especially for objects for which a neural network has not yet been trained. In at least one embodiment, long-range camera(s) 698 may also be used for object detection and classification, as well as basic object tracking.

In at least one embodiment, any number of stereo camera(s) 668 may also be included in a front-facing configuration. In at least one embodiment, one or more of stereo camera(s) 668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 600, including a distance estimate for all points in an image. In at least one embodiment, one or more of stereo camera(s) 668 may include, without limitation, compact stereo vision sensor(s) that may include, without limitation, two camera lenses (one each on left and right) and an image processing chip that may measure distance from vehicle 600 to target object and use generated information (e.g., metadata) to activate autonomous emergency braking and lane departure warning functions. In at least one embodiment, other types of stereo camera(s) 668 may be used in addition to, or alternatively from, those described herein.

In at least one embodiment, cameras with a field of view that include portions of environment to sides of vehicle 600 (e.g., side-view cameras) may be used for surround view, providing information used to create and update an occupancy grid, as well as to generate side impact collision warnings. For example, in at least one embodiment, surround camera(s) 674 (e.g., four surround cameras as illustrated in FIG. 6B) could be positioned on vehicle 600. In at least one embodiment, surround camera(s) 674 may include, without limitation, any number and combination of wide-view cameras, fisheye camera(s), 360-degree camera(s), and/or similar cameras. For instance, in at least one embodiment, four fisheye cameras may be positioned on a front, a rear, and sides of vehicle 600. In at least one embodiment, vehicle 600 may use three surround camera(s) 674 (e.g., left, right, and rear), and may leverage one or more other camera(s) (e.g., a forward-facing camera) as a fourth surround-view camera.

In at least one embodiment, cameras with a field of view that include portions of an environment behind vehicle 600 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 698 and/or mid-range camera(s) 676, stereo camera(s) 468), infrared camera(s) 672, etc.), as described herein.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the autonomous vehicle 600 of FIG. 6B for performing image processing operations, including white balancing operations.

Figure 6C:
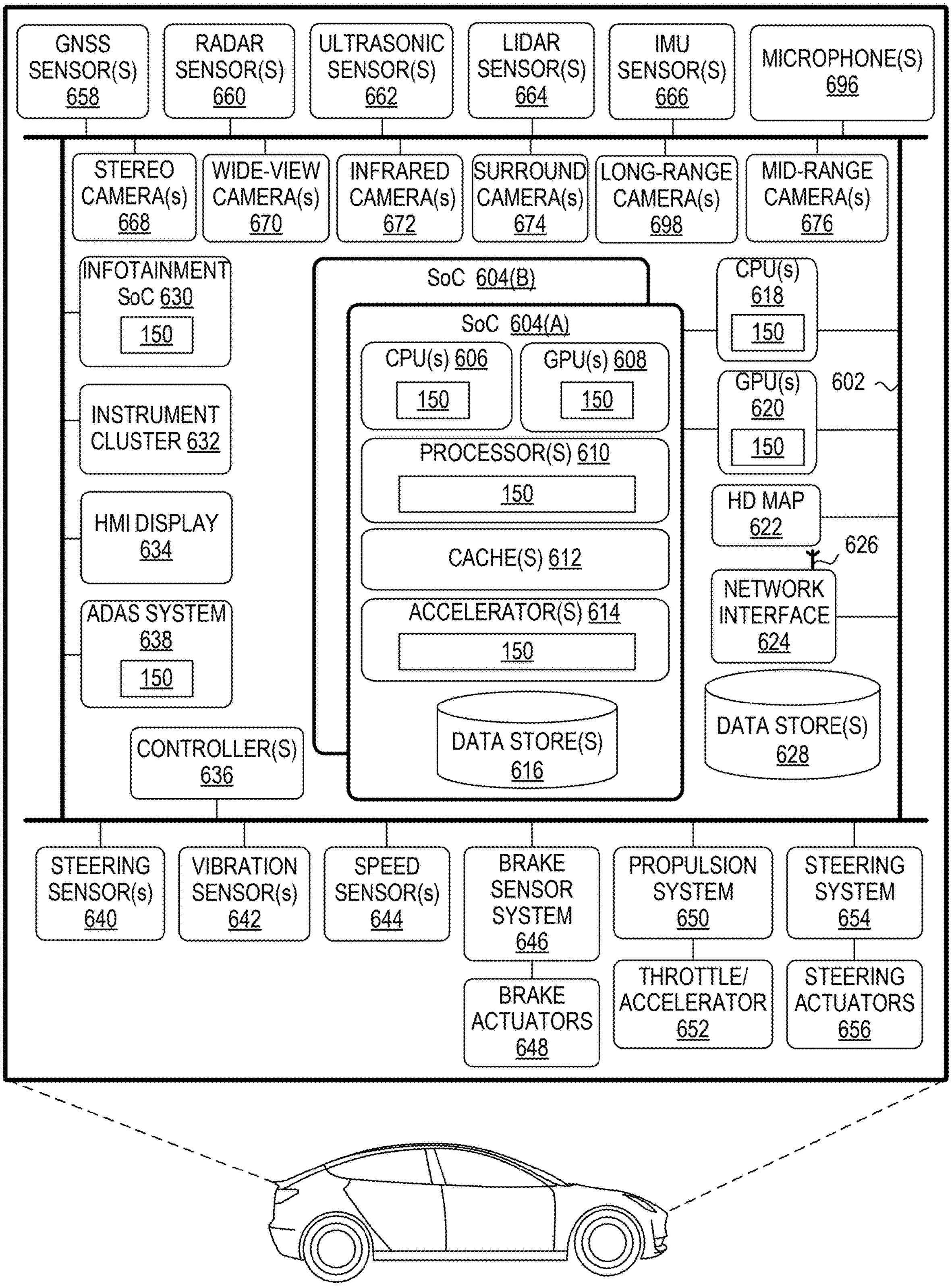
FIG. 6C is a block diagram illustrating an example system architecture for the autonomous vehicle of FIG. 6A, according to at least one embodiment.

FIG. 6C is a block diagram illustrating an example system architecture for autonomous vehicle 600 of FIG. 6A, according to at least one embodiment. In at least one embodiment, each of components, features, and systems of vehicle 600 in FIG. 6C is illustrated as being connected via a bus 602. In at least one embodiment, bus 602 may include, without limitation, a CAN data interface (alternatively referred to herein as a "CAN bus"). In at least one embodiment, a CAN may be a network inside vehicle 600 used to aid in control of various features and functionality of vehicle 600, such as actuation of brakes, acceleration, braking, steering, windshield wipers, etc. In at least one embodiment, bus 602 may be configured to have dozens or even hundreds of nodes, each with its own unique identifier (e.g., a CAN ID). In at least one embodiment, bus 602 may be read to find steering wheel angle, ground speed, engine revolutions per minute ("RPMs"), button positions, and/or other vehicle status indicators. In at least one embodiment, bus 602 may be a CAN bus that is ASKL B compliant.

In at least one embodiment, in addition to, or alternatively from CAN, FlexRay and/or Ethernet protocols may be used. In at least one embodiment, there may be any number of busses forming bus 602, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 602 may communicate with any of components of vehicle 600, and two or more busses of bus 602 may communicate with corresponding components. In at least one embodiment, each of any number of system(s) on chip(s) ("SoC(s)") 604 (such as SoC 604(A) and SoC 604(B), each of controller(s) 636, and/or each computer within vehicle may have access to same input data (e.g., inputs from sensors of vehicle 600), and may be connected to a common bus, such CAN bus.

In at least one embodiment, vehicle 600 may include one or more controller(s) 636, such as those described herein with respect to FIG. 6A. In at least one embodiment, controller(s) 636 may be used for a variety of functions. In at least one embodiment, controller(s) 636 may be coupled to any of various other components and systems of vehicle 600, and may be used for control of vehicle 600, artificial intelligence of vehicle 600, infotainment for vehicle 600, and/or other functions.

In at least one embodiment, vehicle 600 may include any number of SoCs 604. In at least one embodiment, each of SoCs 604 may include, without limitation, central processing units ("CPU(s)") 606, graphics processing units ("GPU (s)") 608, processor(s) 610, cache(s) 612, accelerator(s) 614, data store(s) 616, and/or other components and features not illustrated. In at least one embodiment, SoC(s) 604 may be used to control vehicle 600 in a variety of platforms and systems. For example, in at least one embodiment, SoC(s) 604 may be combined in a system (e.g., system of vehicle 600) with a High Definition ("HD") map 622 which may obtain map refreshes and/or updates via network interface 624 from one or more servers (not shown in FIG. 6C).

In at least one embodiment, CPU(s) 606 may include a CPU cluster or CPU complex (alternatively referred to herein as a "CCPLEX"). In at least one embodiment, CPU(s) 606 may include multiple cores and/or level two ("L2") caches. For instance, in at least one embodiment, CPU(s) 606 may include eight cores in a coherent multi-processor configuration. In at least one embodiment, CPU(s) 606 may include four dual-core clusters where each cluster has a dedicated L2 cache (e.g., a 2 megabyte (MB) L2 cache). In at least one embodiment, CPU(s) 606 (e.g., CCPLEX) may be configured to support simultaneous cluster operations enabling any combination of clusters of CPU(s) 606 to be active at any given time.

In at least one embodiment, one or more of CPU(s) 606 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 606 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 608 may include an integrated GPU (alternatively referred to herein as an "iGPU"). In at least one embodiment, GPU(s) 608 may be programmable and may be efficient for parallel workloads. In at least one embodiment, GPU(s) 608 may use an enhanced tensor instruction set. In at least one embodiment, GPU(s) 608 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 608 may include at least eight streaming microprocessors. In at least one embodiment, GPU(s) 608 may use compute application programming interface(s) (API(s)). In at least one embodiment, GPU(s) 608 may use one or more parallel computing platforms and/or programming models (e.g., NVIDIA's CUDA model).

In at least one embodiment, one or more of GPU(s) 608 may be power-optimized for best performance in automotive and embedded use cases. For example, in at least one embodiment, GPU(s) 608 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 608 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 608 may include unified memory technology. In at least one embodiment, address translation services ("ATS") support may be used to allow GPU(s) 608 to access CPU(s) 606 page tables directly. In at least one embodiment, embodiment, when a GPU of GPU(s) 608 memory management unit ("MMU") experiences a miss, an address translation request may be transmitted to CPU(s) 606. In response, 2 CPU of CPU(s) 606 may look in its page tables for a virtual-to-physical mapping for an address and transmit translation back to GPU(s) 608, in at least one embodiment. In at least one embodiment, unified memory technology may allow a single unified virtual address space for memory of both CPU(s) 606 and GPU(s) 608, thereby simplifying GPU(s) 608 programming and porting of applications to GPU(s) 608.

In at least one embodiment, GPU(s) 608 may include any number of access counters that may keep track of frequency of access of GPU(s) 608 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 604 may include any number of cache(s) 612, including those described herein. For example, in at least one embodiment, cache(s) 612 could include a level three ("L3") cache that is available to both CPU(s) 606 and GPU(s) 608 (e.g., that is connected to CPU(s) 606 and GPU(s) 408). In at least one embodiment, cache(s) 612 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 604 may include one or more accelerator(s) 614 (e.g., hardware accelerators, software accelerators, or a combination thereof). In at least one embodiment, SoC(s) 604 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 608 and to off-load some of tasks of GPU(s) 608 (e.g., to free up more cycles of GPU(s) 608 for performing other tasks). In at least one embodiment, accelerator(s) 614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 614 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 608, and by using an inference accelerator, for example, a designer may target either DLA(s) or GPU(s) 608 for any function. For example, in at least one embodiment, a designer may focus processing of CNNs and floating point operations on DLA(s) and leave other functions to GPU(s) 608 and/or accelerator(s) 614.

In at least one embodiment, accelerator(s) 614 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 638, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 606. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 614 may include a computer vision network on-chip and static random-access memory ("SRAM"), for providing a high-bandwidth, low latency SRAM for accelerator(s) 614. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 614 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 600, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 6D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 666 that correlates with vehicle 600 orientation, distance, 3D location estimates of object obtained from neural network and/or other sensors (e.g., LIDAR sensor(s) 664 or RADAR sensor(s) 460), among others.

In at least one embodiment, one or more of SoC(s) 604 may include data store(s) 616 (e.g., memory). In at least one embodiment, data store(s) 616 may be on-chip memory of SoC(s) 604, which may store neural networks to be executed on GPU(s) 608 and/or a DLA. In at least one embodiment, data store(s) 616 may be large enough in capacity to store multiple instances of neural networks for redundancy and safety. In at least one embodiment, data store(s) 616 may comprise L2 or L3 cache(s).

In at least one embodiment, one or more of SoC(s) 604 may include any number of processor(s) 610 (e.g., embedded processors). In at least one embodiment, processor(s) 610 may include a boot and power management processor that may be a dedicated processor and subsystem to handle boot power and management functions and related security enforcement. In at least one embodiment, a boot and power management processor may be a part of a boot sequence of SoC(s) 604 and may provide runtime power management services. In at least one embodiment, a boot power and management processor may provide clock and voltage programming, assistance in system low power state transitions, management of SoC(s) 604 thermals and temperature sensors, and/or management of SoC(s) 604 power states. In at least one embodiment, each temperature sensor may be implemented as a ring-oscillator whose output frequency is proportional to temperature, and SoC(s) 604 may use ring-oscillators to detect temperatures of CPU(s) 606, GPU(s) 608, and/or accelerator(s) 614. In at least one embodiment, if temperatures are determined to exceed a threshold, then a boot and power management processor may enter a temperature fault routine and put SoC(s) 604 into a lower power state and/or put vehicle 600 into a chauffeur to safe stop mode (e.g., bring vehicle 600 to a safe stop).

In at least one embodiment, processor(s) 610 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 610 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 610 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 610 may further include a real-time camera engine that may include, without limitation, a dedicated processor subsystem for handling real-time camera management. In at least one embodiment, processor (s) 610 may further include a high-dynamic range signal processor that may include, without limitation, an image signal processor that is a hardware engine that is part of a camera processing pipeline.

In at least one embodiment, processor(s) 610 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 670, surround camera(s) 674, and/or on in-cabin monitoring camera sensor(s). In at least one embodiment, in-cabin monitoring camera sensor(s) are preferably monitored by a neural network running on another instance of SoC 604, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 608 are not required to continuously render new surfaces. In at least one embodiment, when GPU(s) 608 are powered on and active doing 3D rendering, a video image compositor may be used to offload GPU(s) 608 to improve performance and responsiveness.

In at least one embodiment, one or more SoC of SoC(s) 604 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 604 may further include an input/output controller(s) that may be controlled by software and may be used for receiving I/O signals that are uncommitted to a specific role.

In at least one embodiment, one or more Soc of SoC(s) 604 may further include a broad range of peripheral interfaces to enable communication with peripherals, audio encoders/decoders ("codecs"), power management, and/or other devices. In at least one embodiment, SoC(s) 604 may be used to process data from cameras (e.g., connected over Gigabit Multimedia Serial Link and Ethernet channels), sensors (e.g., LIDAR sensor(s) 664, RADAR sensor(s) 660, etc. that may be connected over Ethernet channels), data from bus 602 (e.g., speed of vehicle 600, steering wheel position, etc.), data from GNSS sensor(s) 658 (e.g., connected over a Ethernet bus or a CAN bus), etc. In at least one embodiment, one or more SoC of SoC(s) 604 may further include dedicated high-performance mass storage controllers that may include their own DMA engines, and that may be used to free CPU(s) 606 from routine data management tasks.

In at least one embodiment, SoC(s) 604 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 604 may be faster, more reliable, and even more energy-efficient and space-efficient than conventional systems. For example, in at least one embodiment, accelerator(s) 614, when combined with CPU(s) 606, GPU(s) 608, and data store(s) 616, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 420) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 608.

In at least one embodiment, a CNN for facial recognition and vehicle owner identification may use data from camera sensors to identify presence of an authorized driver and/or owner of vehicle 600. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 604 provide for security against theft and/or carjacking.

In at least one embodiment, a CNN for emergency vehicle detection and identification may use data from microphones 696 to detect and identify emergency vehicle sirens. In at least one embodiment, SoC(s) 604 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 658. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 662, until emergency vehicles pass.

In at least one embodiment, vehicle 600 may include CPU(s) 618 (e.g., discrete CPU(s), or dCPU(s)), that may be coupled to SoC(s) 604 via a high-speed interconnect (e.g., PCIe). In at least one embodiment, CPU(s) 618 may include an X86 processor, for example. CPU(s) 618 may be used to perform any of a variety of functions, including arbitrating potentially inconsistent results between ADAS sensors and SoC(s) 604, and/or monitoring status and health of controller(s) 636 and/or an infotainment system on a chip ("infotainment SoC") 630, for example.

In at least one embodiment, vehicle 600 may include GPU(s) 620 (e.g., discrete GPU(s), or dGPU(s)), that may be coupled to SoC(s) 604 via a high-speed interconnect (e.g., NVIDIA's NVLINK channel). In at least one embodiment, GPU(s) 620 may provide additional artificial intelligence functionality, such as by executing redundant and/or different neural networks and may be used to train and/or update neural networks based at least in part on input (e.g., sensor data) from sensors of a vehicle 600.

In at least one embodiment, vehicle 600 may further include network interface 624 which may include, without limitation, wireless antenna(s) 626 (e.g., one or more wireless antennas for different communication protocols, such as a cellular antenna, a Bluetooth antenna, etc.). In at least one embodiment, network interface 624 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 40 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 600 information about vehicles in proximity to vehicle 600 (e.g., vehicles in front of, on a side of, and/or behind vehicle 600). In at least one embodiment, such aforementioned functionality may be part of a cooperative adaptive cruise control functionality of vehicle 600.

In at least one embodiment, network interface 624 may include an SoC that provides modulation and demodulation functionality and enables controller(s) 636 to communicate over wireless networks. In at least one embodiment, network interface 624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 600 may further include data store(s) 628 which may include, without limitation, off-chip (e.g., off SoC(s) 404) storage. In at least one embodiment, data store(s) 628 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 600 may further include GNSS sensor(s) 658 (e.g., GPS and/or assisted GPS sensors), to assist in mapping, perception, occupancy grid generation, and/or path planning functions. In at least one embodiment, any number of GNSS sensor(s) 658 may be used, including, for example and without limitation, a GPS using a USB connector with an Ethernet-to-Serial (e.g., RS-232) bridge.

In at least one embodiment, vehicle 600 may further include RADAR sensor(s) 660. In at least one embodiment, RADAR sensor(s) 660 may be used by vehicle 600 for long-range vehicle detection, even in darkness and/or severe weather conditions. In at least one embodiment, RADAR functional safety levels may be ASIL B. In at least one embodiment, RADAR sensor(s) 660 may use a CAN bus and/or bus 602 (e.g., to transmit data generated by RADAR sensor(s) 460) for control and to access object tracking data, with access to Ethernet channels to access raw data in some examples. In at least one embodiment, a wide variety of RADAR sensor types may be used. For example, and without limitation, RADAR sensor(s) 660 may be suitable for front, rear, and side RADAR use. In at least one embodiment, one or more sensor of RADAR sensors(s) 660 is a Pulse Doppler RADAR sensor.

In at least one embodiment, RADAR sensor(s) 660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 660 may help in distinguishing between static and moving objects and may be used by ADAS system 638 for emergency brake assist and forward collision warning. In at least one embodiment, sensors 460(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 600 surroundings at higher speeds with minimal interference from traffic in adjacent lanes. In at least one embodiment, another two antennae may expand field of view, making it possible to quickly detect vehicles entering or leaving a lane of vehicle 600.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 660 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 638 for blind spot detection and/or lane change assist.

In at least one embodiment, vehicle 600 may further include ultrasonic sensor(s) 662. In at least one embodiment, ultrasonic sensor(s) 662, which may be positioned at a front, a back, and/or side location of vehicle 600, may be used for parking assist and/or to create and update an occupancy grid. In at least one embodiment, a wide variety of ultrasonic sensor(s) 662 may be used, and different ultrasonic sensor(s) 662 may be used for different ranges of detection (e.g., 2.5 m, 4 m). In at least one embodiment, ultrasonic sensor(s) 662 may operate at functional safety levels of ASIL B.

In at least one embodiment, vehicle 600 may include LIDAR sensor(s) 664. In at least one embodiment, LIDAR sensor(s) 664 may be used for object and pedestrian detection, emergency braking, collision avoidance, and/or other functions. In at least one embodiment, LIDAR sensor(s) 664 may operate at functional safety level ASIL B. In at least one embodiment, vehicle 600 may include multiple LIDAR sensors 664 (e.g., two, four, six, etc.) that may use an Ethernet channel (e.g., to provide data to a Gigabit Ethernet switch).

In at least one embodiment, LIDAR sensor(s) 664 may be capable of providing a list of objects and their distances for a 360-degree field of view. In at least one embodiment, commercially available LIDAR sensor(s) 664 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 664 may include a small device that may be embedded into a front, a rear, a side, and/or a corner location of vehicle 600. In at least one embodiment, LIDAR sensor(s) 664, in such an embodiment, may provide up to a 120-degree horizontal and 35-degree vertical field-of-view, with a 200 m range even for low-reflectivity objects. In at least one embodiment, front-mounted LIDAR sensor(s) 664 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 600 up to approximately 200 m. In at least one embodiment, a flash LIDAR unit includes, without limitation, a receptor, which records laser pulse transit time and reflected light on each pixel, which in turn corresponds to a range from vehicle 600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 600 may further include IMU sensor(s) 666. In at least one embodiment, IMU sensor(s) 666 may be located at a center of a rear axle of vehicle 600. In at least one embodiment, IMU sensor(s) 666 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 666 may include, without limitation, accelerometers and gyroscopes. In at least one embodiment, such as in nine-axis applications, IMU sensor(s) 666 may include, without limitation, accelerometers, gyroscopes, and magnetometers.

In at least one embodiment, IMU sensor(s) 666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 666 may enable vehicle 600 to estimate its heading without requiring input from a magnetic sensor by directly observing and correlating changes in velocity from a GPS to IMU sensor(s) 666. In at least one embodiment, IMU sensor(s) 666 and GNSS sensor(s) 658 may be combined in a single integrated unit.

In at least one embodiment, vehicle 600 may include microphone(s) 696 placed in and/or around vehicle 600. In at least one embodiment, microphone(s) 696 may be used for emergency vehicle detection and identification, among other things.

In at least one embodiment, vehicle 600 may further include any number of camera types, including stereo camera(s) 668, wide-view camera(s) 670, infrared camera(s) 672, surround camera(s) 674, long-range camera(s) 698, mid-range camera(s) 676, and/or other camera types. In at least one embodiment, cameras may be used to capture image data around an entire periphery of vehicle 600. In at least one embodiment, which types of cameras used depends on vehicle 600. In at least one embodiment, any combination of camera types may be used to provide necessary coverage around vehicle 600. In at least one embodiment, a number of cameras deployed may differ depending on embodiment. For example, in at least one embodiment, vehicle 600 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 6A and FIG. 6B.

In at least one embodiment, vehicle 600 may further include vibration sensor(s) 642. In at least one embodiment, vibration sensor(s) 642 may measure vibrations of components of vehicle 600, such as axle(s). For example, in at least one embodiment, changes in vibrations may indicate a change in road surfaces. In at least one embodiment, when two or more vibration sensors 642 are used, differences between vibrations may be used to determine friction or slippage of road surface (e.g., when a difference in vibration is between a power-driven axle and a freely rotating axle).

In at least one embodiment, vehicle 600 may include ADAS system 638. In at least one embodiment, ADAS system 638 may include, without limitation, an SoC, in some examples. In at least one embodiment, ADAS system 638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 660, LIDAR sensor(s) 664, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 600 and automatically adjusts speed of vehicle 600 to maintain a safe distance from vehicles ahead. In at least one embodiment, a lateral ACC system performs distance keeping, and advises vehicle 600 to change lanes when necessary. In at least one embodiment, a lateral ACC is related to other ADAS applications, such as LC and CW.

In at least one embodiment, a CACC system uses information from other vehicles that may be received via network interface 624 and/or wireless antenna(s) 626 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 600), while I2V communication provides information about traffic further ahead. In at least one embodiment, a CACC system may include either or both I2V and V2V information sources. In at least one embodiment, given information of vehicles ahead of vehicle 600, a CACC system may be more reliable, and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 660, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object and may automatically apply brakes if a driver does not take corrective action within a specified time or distance parameter. In at least one embodiment, AEB system may use front-facing camera(s) and/or RADAR sensor(s) 660, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 600 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 600 if vehicle 600 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 600 is backing up. In at least one embodiment, an RCTW system includes an AEB system to ensure that vehicle brakes are applied to avoid a crash. In at least one embodiment, an RCTW system may use one or more rear-facing RADAR sensor(s) 660, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 600 itself decides, in case of conflicting results, whether to heed result from a primary computer or a secondary computer (e.g., a first controller or a second controller of controllers 436). For example, in at least one embodiment, ADAS system 638 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 638 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 604.

In at least one embodiment, ADAS system 638 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 638 may be fed into a primary computer's perception block and/or a primary computer's dynamic driving task block. For example, in at least one embodiment, if ADAS system 638 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 600 may further include infotainment SoC 630 (e.g., an in-vehicle infotainment system (IVI)). Although illustrated and described as an SoC, infotainment system SoC 630, in at least one embodiment, may not be an SoC, and may include, without limitation, two or more discrete components. In at least one embodiment, infotainment SoC 630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 600. For example, infotainment SoC 630 could include radios, disk players, navigation systems, video players, USB and Bluetooth connectivity, carputers, in-car entertainment, WiFi, steering wheel audio controls, hands free voice control, a heads-up display ("HUD"), HMI display 634, a telematics device, a control panel (e.g., for controlling and/or interacting with various components, features, and/or systems), and/or other components. In at least one embodiment, infotainment SoC 630 may further be used to provide information (e.g., visual and/or audible) to user(s) of vehicle 600, such as information from ADAS system 638, autonomous driving information such as planned vehicle maneuvers, trajectories, surrounding environment information (e.g., intersection information, vehicle information, road information, etc.), and/or other information.

In at least one embodiment, infotainment SoC 630 may include any amount and type of GPU functionality. In at least one embodiment, infotainment SoC 630 may communicate over bus 602 with other devices, systems, and/or components of vehicle 600. In at least one embodiment, infotainment SoC 630 may be coupled to a supervisory MCU such that a GPU of an infotainment system may perform some self-driving functions in event that primary controller(s) 636 (e.g., primary and/or backup computers of vehicle 600) fail. In at least one embodiment, infotainment SoC 630 may put vehicle 600 into a chauffeur to safe stop mode, as described herein.

In at least one embodiment, vehicle 600 may further include instrument cluster 632 (e.g., a digital dash, an electronic instrument cluster, a digital instrument panel, etc.). In at least one embodiment, instrument cluster 632 may include, without limitation, a controller and/or supercomputer (e.g., a discrete controller or supercomputer). In at least one embodiment, instrument cluster 632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 630 and instrument cluster 632. In at least one embodiment, instrument cluster 632 may be included as part of infotainment SoC 630, or vice versa.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system architecture of FIG. 6C for performing image processing operations, including white balancing operations.

Figure 6D:
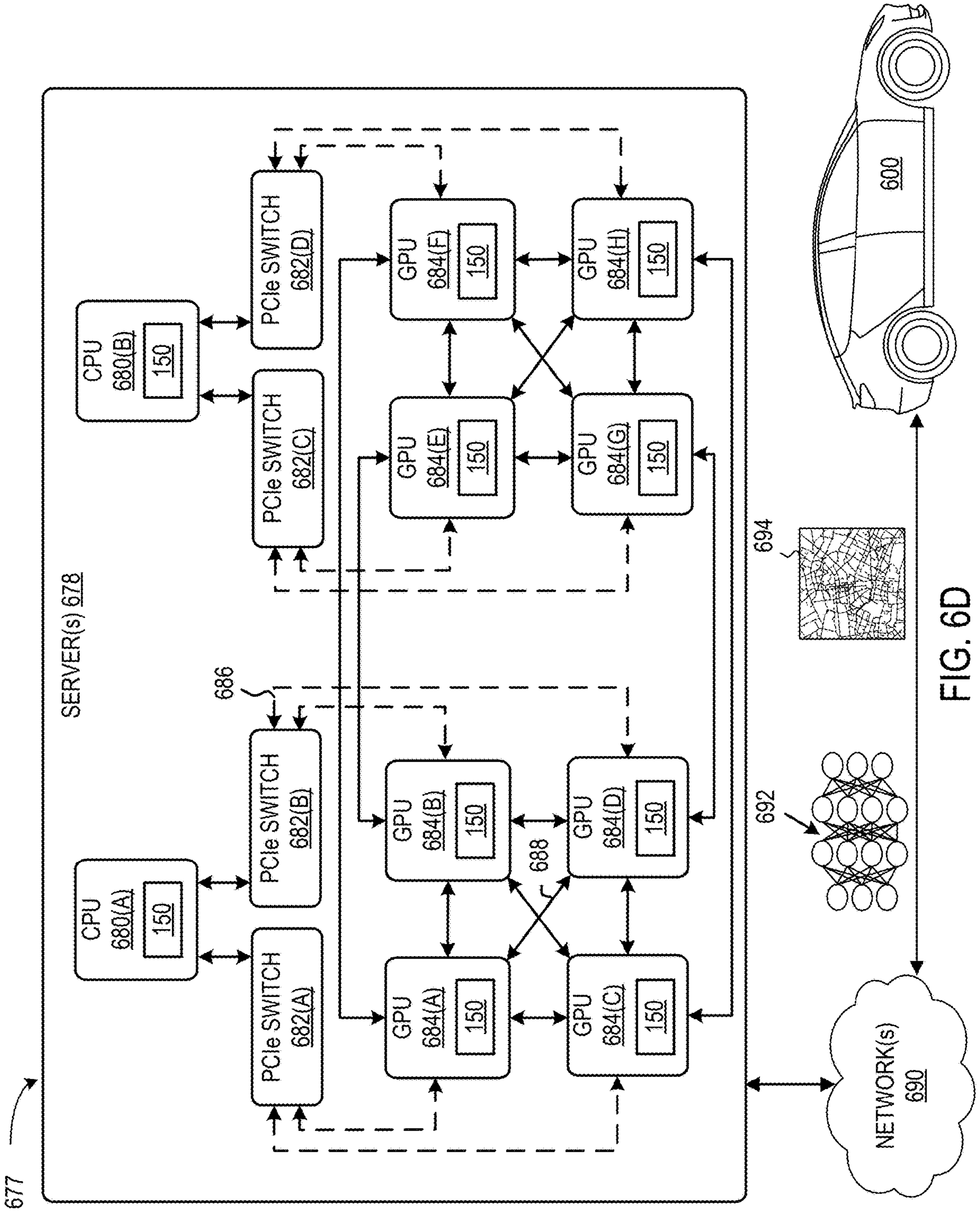
FIG. 6D is a diagram illustrating a system for communication between cloud-based server(s) and the autonomous vehicle of FIG. 6A, according to at least one embodiment.

FIG. 6D is a diagram of a system 677 for communication between cloud-based server(s) and autonomous vehicle 600 of FIG. 6A, according to at least one embodiment. In at least one embodiment, system 677 may include, without limitation, server(s) 678, network(s) 690, and any number and type of vehicles, including vehicle 600. In at least one embodiment, server(s) 678 may include, without limitation, a plurality of GPUs 484(A)-484(H) (collectively referred to herein as GPUs 484), PCIe switches 482(A)-482(D) (collectively referred to herein as PCIe switches 482), and/or CPUs 480(A)-480(B) (collectively referred to herein as CPUs 480). In at least one embodiment, GPUs 684, CPUs 680, and PCIe switches 682 may be interconnected with high-speed interconnects such as, for example and without limitation, NVLink interfaces 688 developed by NVIDIA and/or PCIe connections 686. In at least one embodiment, GPUs 684 are connected via an NVLink and/or NVSwitch SoC and GPUs 684 and PCIe switches 682 are connected via PCIe interconnects. Although eight GPUs 684, two CPUs 680, and four PCIe switches 682 are illustrated, this is not intended to be limiting. In at least one embodiment, each of server(s) 678 may include, without limitation, any number of GPUs 684, CPUs 680, and/or PCIe switches 682, in any combination. For example, in at least one embodiment, server(s) 678 could each include eight, sixteen, thirty-two, and/or more GPUs 684.

In at least one embodiment, server(s) 678 may receive, over network(s) 690 and from vehicles, image data representative of images showing unexpected or changed road conditions, such as recently commenced road-work. In at least one embodiment, server(s) 678 may transmit, over network(s) 690 and to vehicles, neural networks 692, updated or otherwise, and/or map information 694, including, without limitation, information regarding traffic and road conditions. In at least one embodiment, updates to map information 694 may include, without limitation, updates for HD map 622, such as information regarding construction sites, potholes, detours, flooding, and/or other obstructions. In at least one embodiment, neural networks 692, and/or map information 694 may have resulted from new training and/or experiences represented in data received from any number of vehicles in an environment, and/or based at least in part on training performed at a data center (e.g., using server(s) 678 and/or other servers).

In at least one embodiment, server(s) 678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 490), and/or machine learning models may be used by server(s) 678 to remotely monitor vehicles.

In at least one embodiment, server(s) 678 may receive data from vehicles and apply data to up-to-date real-time neural networks for real-time intelligent inferencing. In at least one embodiment, server(s) 678 may include deep-learning supercomputers and/or dedicated AI computers powered by GPU(s) 684, such as a DGX and DGX Station machines developed by NVIDIA. However, in at least one embodiment, server(s) 678 may include deep learning infrastructure that uses CPU-powered data centers.

In at least one embodiment, deep-learning infrastructure of server(s) 678 may be capable of fast, real-time inferencing, and may use that capability to evaluate and verify health of processors, software, and/or associated hardware in vehicle 600. For example, in at least one embodiment, deep-learning infrastructure may receive periodic updates from vehicle 600, such as a sequence of images and/or objects that vehicle 600 has located in that sequence of images (e.g., via computer vision and/or other machine learning object classification techniques). In at least one embodiment, deep-learning infrastructure may run its own neural network to identify objects and compare them with objects identified by vehicle 600 and, if results do not match and deep-learning infrastructure concludes that AI in vehicle 600 is malfunctioning, then server(s) 678 may transmit a signal to vehicle 600 instructing a fail-safe computer of vehicle 600 to assume control, notify passengers, and complete a safe parking maneuver.

In at least one embodiment, server(s) 678 may include GPU(s) 684 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) implementing processing logic 135 are used to perform one or more embodiments. Details regarding processing logic 135 are provided herein in conjunction with FIG. 1.

Figure 7:
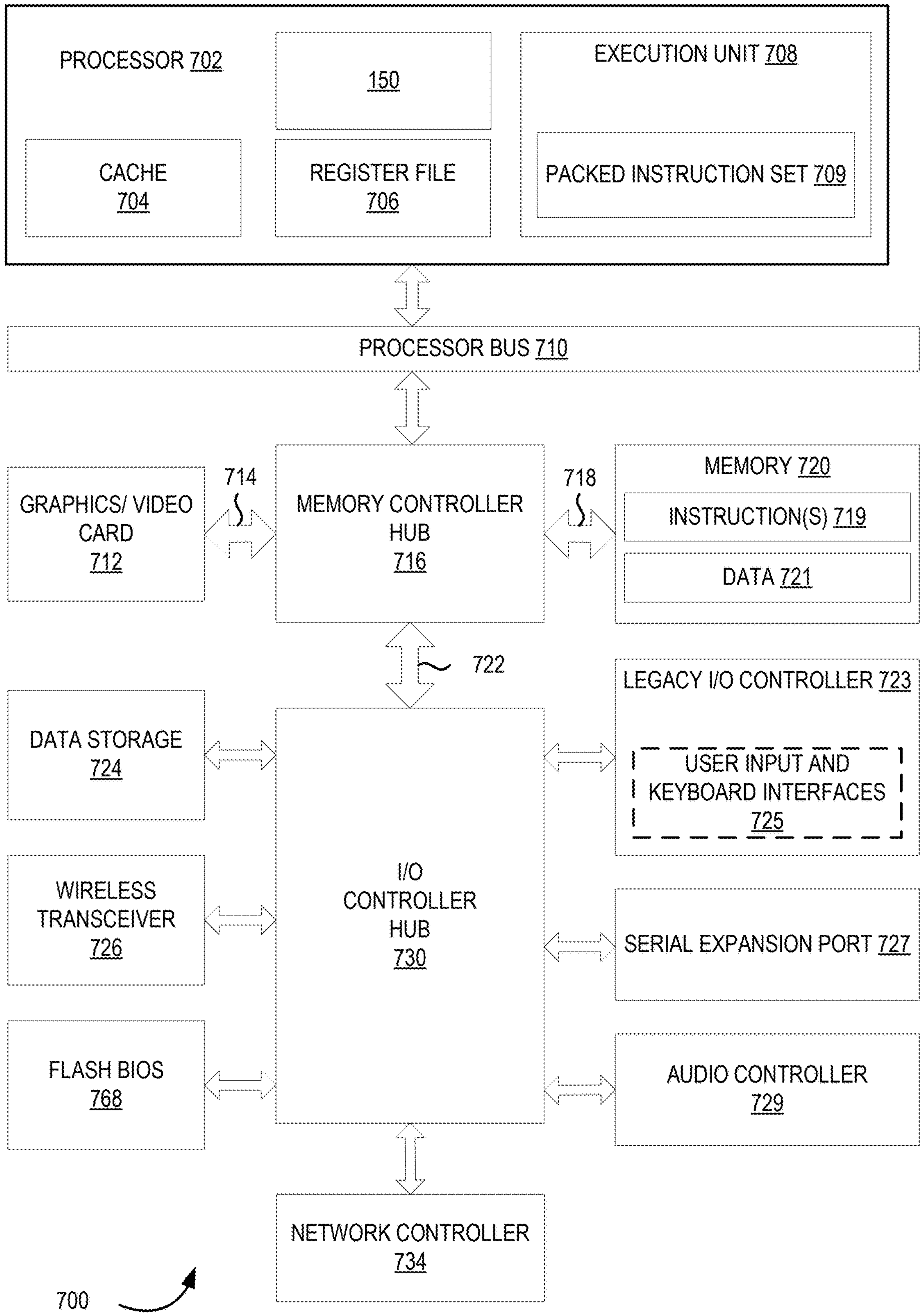
FIG. 7 is a block diagram illustrating a computer system, according to at least one embodiment.

FIG. 7 is a block diagram illustrating an example computer system, which may be a system with interconnected devices and components, a system-on-a-chip (SOC) or some combination thereof formed with a processor that may include execution units to execute an instruction, according to at least one embodiment. In at least one embodiment, a computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 700 may include, without limitation, processor 702 that may include, without limitation, one or more execution units 708 to perform image processing and white balancing according to techniques described herein. In at least one embodiment, computer system 700 is a single processor desktop or server system, but in another embodiment, computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, a register file 706 may store different types of data in various registers including, without limitation, integer registers, floating point registers, status registers, and an instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor, along with associated circuitry to execute instructions, operations used by many multimedia applications may be performed using packed data in processor 702. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be a Dynamic Random Access Memory ("DRAM") device, a Static Random Access Memory ("SRAM") device, a flash memory device, or another memory device. In at least one embodiment, memory 720 may store instruction(s) 719 and/or data 721 represented by data signals that may be executed by processor 702.

In at least one embodiment, a system logic chip may be coupled to processor bus 710 and memory 720. In at least one embodiment, a system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O interface 722. In at least one embodiment, a system logic chip may provide a graphics port for coupling to a graphics controller. In at least one embodiment, MCH 716 may be coupled to memory 720 through high bandwidth memory path 718 and a graphics/video card 712 may be coupled to MCH 716 through an Accelerated Graphics Port ("AGP") interconnect 714.

In at least one embodiment, computer system 700 may use system I/O interface 722 as a proprietary hub interface bus to couple MCH 716 to an I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as a Universal Serial Bus ("USB") port, and a network controller 734. In at least one embodiment, data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an example SoC. In at least one embodiment, devices illustrated in FIG. 7 may be interconnected with proprietary interconnects, standardized interconnects (e.g., PCIe) or some combination thereof. In at least one embodiment, one or more components of computer system 700 are interconnected using compute express link (CXL) interconnects.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system of FIG. 7 for performing image processing operations, including white balancing operations.

Figure 8:
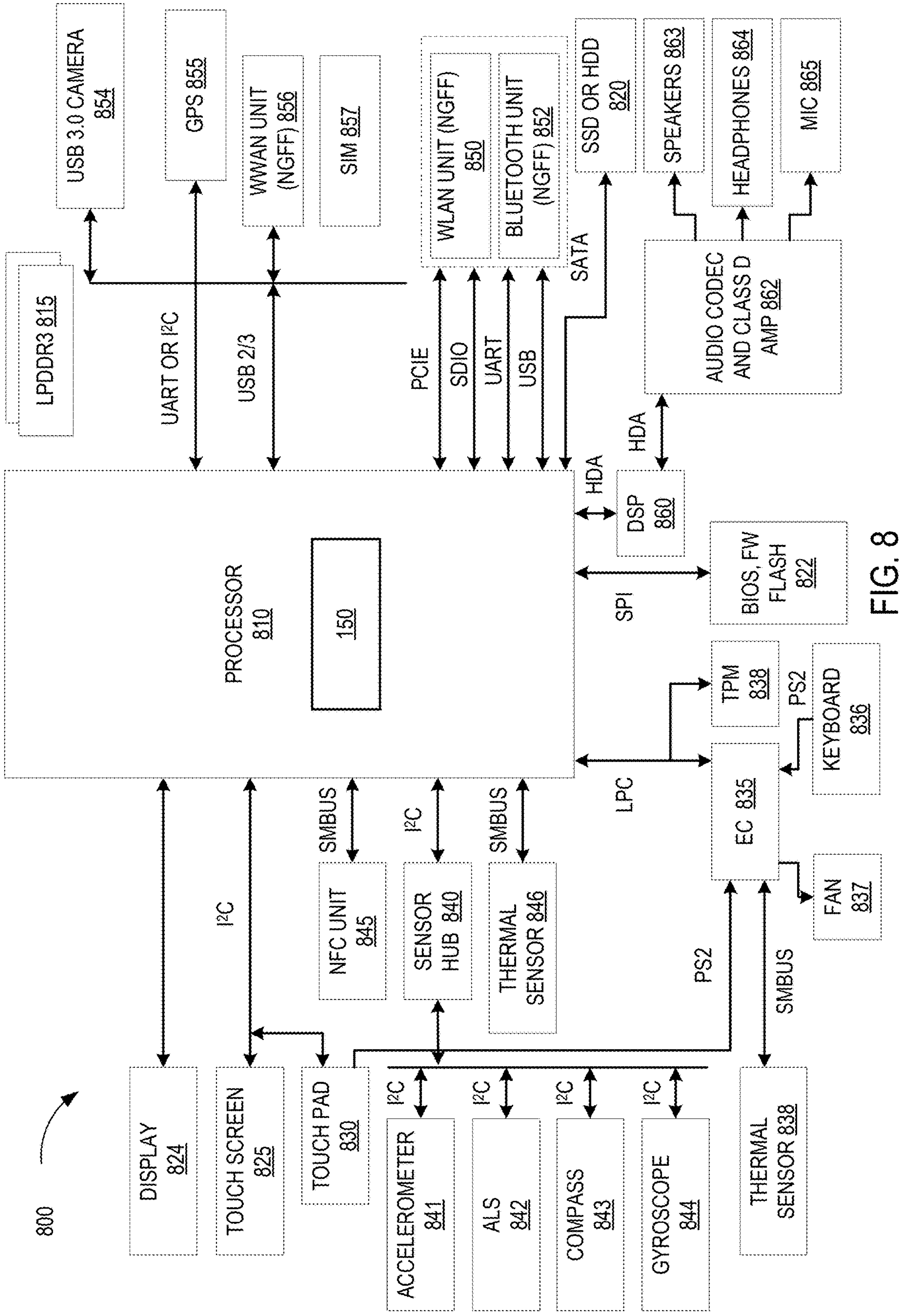
FIG. 8 is a block diagram illustrating a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 800 may include, without limitation, processor 810 communicatively coupled to any suitable number or kind of components, peripherals, modules, or devices. In at least one embodiment, processor 810 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an example SoC. In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 6 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) unit 855, a camera ("USB 3.0 camera") 854 such as a USB 3.0 camera, and/or a Low Power Double Data Rate ("LPDDR") memory unit ("LPDDR3") 815 implemented in, for example, an LPDDR3 standard. These components may each be implemented in any suitable manner.

In at least one embodiment, other components may be communicatively coupled to processor 810 through components described herein. In at least one embodiment, an accelerometer 841, an ambient light sensor ("ALS") 842, a compass 843, and a gyroscope 844 may be communicatively coupled to sensor hub 840. In at least one embodiment, a thermal sensor 839, a fan 837, a keyboard 836, and touch pad 830 may be communicatively coupled to EC 835. In at least one embodiment, speakers 863, headphones 864, and a microphone ("mic") 865 may be communicatively coupled to an audio unit ("audio codec and class D amp") 862, which may in turn be communicatively coupled to DSP 860. In at least one embodiment, audio unit 862 may include, for example and without limitation, an audio coder/decoder ("codec") and a class D amplifier. In at least one embodiment, a SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the electronic device of FIG. 8 for performing image processing operations, including white balancing operations.

Figure 9:
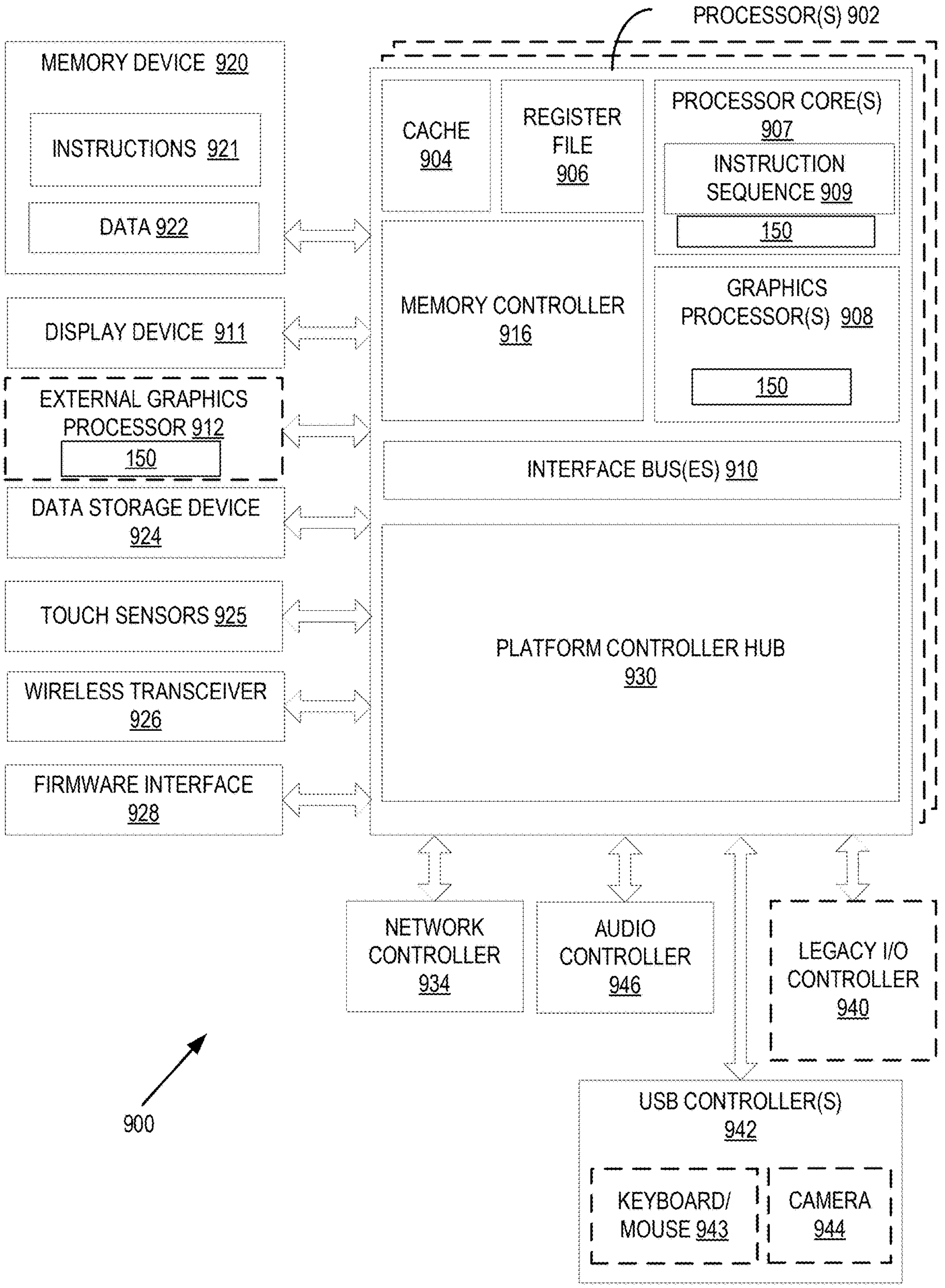
FIG. 9 illustrates at least portions of a graphics processor, according to at least one embodiment.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, or embedded devices.

In at least one embodiment, system 900 can include, or be incorporated within a server-based gaming platform, a game console, including a game and media console, a mobile gaming console, a handheld game console, or an online game console. In at least one embodiment, system 900 is a mobile phone, a smart phone, a tablet computing device or a mobile Internet device. In at least one embodiment, processing system 900 can also include, couple with, or be integrated within a wearable device, such as a smart watch wearable device, a smart eyewear device, an augmented reality device, or a virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction sequence 909. In at least one embodiment, instruction sequence 909 may facilitate Complex Instruction Set Computing (CISC), Reduced Instruction Set Computing (RISC), or computing via a Very Long Instruction Word (VLIW). In at least one embodiment, processor cores 907 may each process a different instruction sequence 909, which may include instructions to facilitate emulation of other instruction sequences. In at least one embodiment, processor core 907 may also include other processing devices, such a Digital Signal Processor (DSP).

In at least one embodiment, processor 902 includes a cache memory 904. In at least one embodiment, processor 902 can have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, a register file 906 is additionally included in processor 902, which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910 can be a processor bus, such as a version of a Direct Media Interface (DMI) bus. In at least one embodiment, interface bus 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, a memory device 920 can be a dynamic random access memory (DRAM) device, a static random access memory (SRAM) device, flash memory device, phase-change memory device, or some other memory device having suitable performance to serve as process memory. In at least one embodiment, memory device 920 can operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 can connect to processor(s) 902. In at least one embodiment, display device 911 can include one or more of an internal display device, as in a mobile electronic device or a laptop device, or an external display device attached via a display interface (e.g., DisplayPort, etc.). In at least one embodiment, display device 911 can include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 can connect via a storage interface (e.g., SATA) or via a peripheral bus, such as a Peripheral Component Interconnect bus (e.g., PCI, PCI Express). In at least one embodiment, touch sensors 925 can include touch screen sensors, pressure sensors, or fingerprint sensors. In at least one embodiment, wireless transceiver 926 can be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and can be, for example, a unified extensible firmware interface (UEFI). In at least one embodiment, network controller 934 can enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system 900. In at least one embodiment, platform controller hub 930 can also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 can include an external memory controller 916 and platform controller hub 930, which may be configured as a memory controller hub and peripheral controller hub within a system chipset that is in communication with processor(s) 902.

Processing logic 135 may be used to perform image processing operations, including white balancing operations, associated with one or more embodiments. Details regarding processing logic 135 are provided herein in conjunction with FIG. 1. In at least one embodiment, processing logic 135 may be used in the system of FIG. 9 for performing image processing operations, including white balancing operations.

Figure 10:
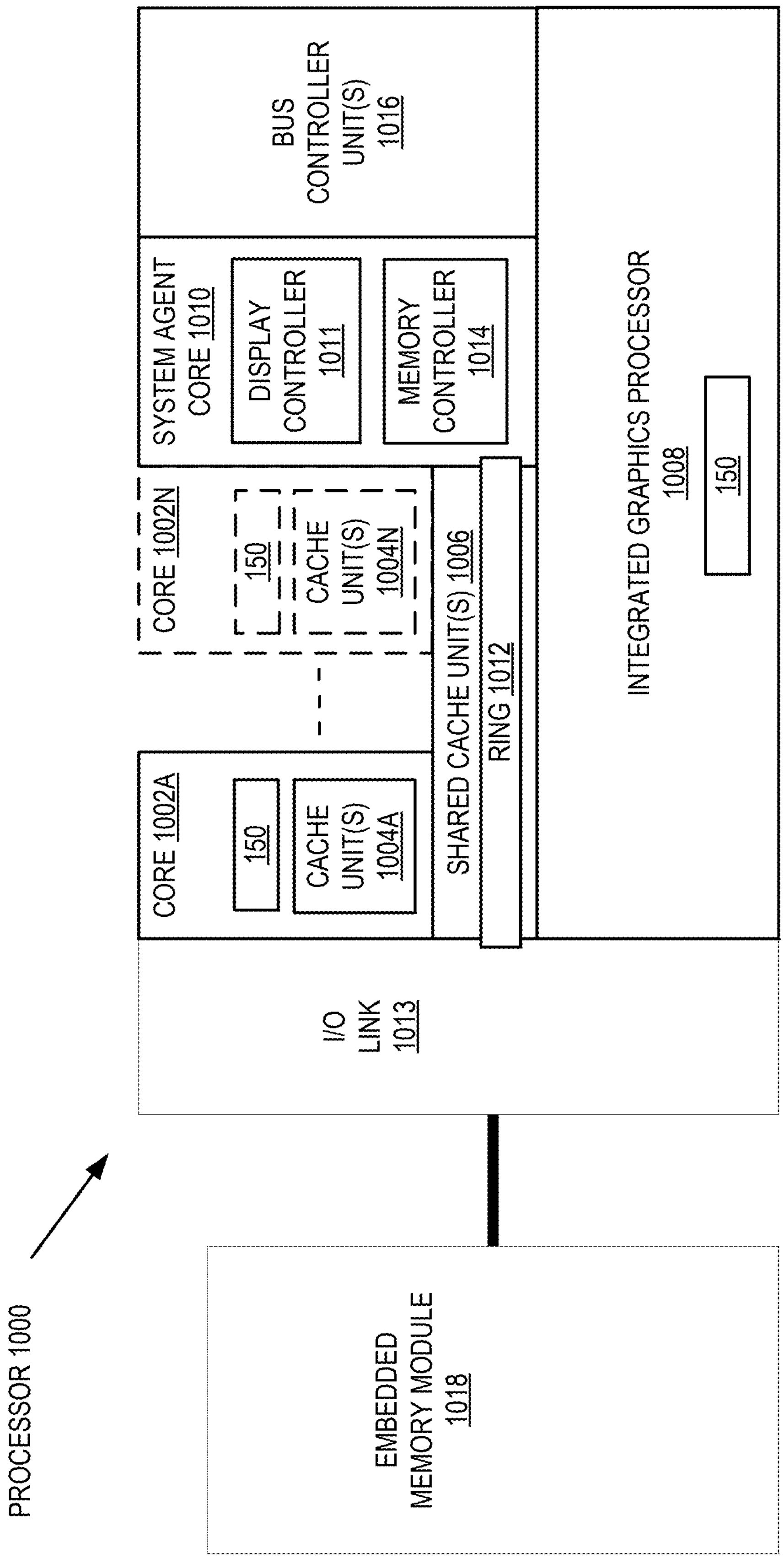
FIG. 10 illustrates at least portions of a graphics processor, according to at least one embodiment.

FIG. 10 is a block diagram of a processor 1000 having one or more processor cores 1002A-1002N, an integrated memory controller 1014, and an integrated graphics processor 1008, according to at least one embodiment. In at least one embodiment, processor 1000 can include additional cores up to and including additional core 1002N represented by dashed lined boxes. In at least one embodiment, each of processor cores 1002A-1002N includes one or more internal cache units 1004A-1004N. In at least one embodiment, each processor core also has access to one or more shared cached units 1006.

In at least one embodiment, internal cache units 1004A-1004N and shared cache units 1006 represent a cache memory hierarchy within processor 1000. In at least one embodiment, cache memory units 1004A-1004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1004N.

In at least one embodiment, processor 1000 may also include a set of one or more bus controller units 1016 and a system agent core 1010. In at least one embodiment, bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1014 to manage access to various external memory devices (not shown).

In at least one embodiment, one or more of processor cores 1002A-1002N include support for simultaneous multi-threading. In at least one embodiment, system agent core 1010 includes components for coordinating and operating cores 1002A-1002N during multi-threaded processing. In at least one embodiment, system agent core 1010 may additionally include a power control unit (PCU), which includes logic and components to regulate one or more power states of processor cores 1002A-1002N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1014. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring-based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 2113.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1002N and graphics processor 1008 use embedded memory module 1018 as a shared Last Level Cache.

In at least one embodiment, processor cores 1002A-1002N are homogeneous cores executing a common instruction set architecture. In at least one embodiment, processor cores 1002A-1002N are heterogeneous in terms of instruction set architecture (ISA), where one or more of processor cores 1002A-1002N execute a common instruction set, while one or more other cores of processor cores 1002A-1002N executes a subset of a common instruction set or a different instruction set. In at least one embodiment, processor cores 1002A-1002N are heterogeneous in terms of microarchitecture, where one or more cores having a relatively higher power consumption couple with one or more power cores having a lower power consumption. In at least one embodiment, processor 1000 can be implemented on one or more chips or as an SoC integrated circuit.

Processing logic 135 may be used to perform image processing operations, including white balancing operations, associated with one or more embodiments. Details regarding processing logic 135 are provided herein in conjunction with FIG. 1. In at least one embodiment, processing logic 135 may be incorporated into graphics processor 1008. For example, in at least one embodiment, image processing and/or white balancing techniques described herein may use one or more of ALUs embodied in a 3D pipeline, graphics core(s) 1002, shared function logic, or other logic in FIG. 10. Moreover, in at least one embodiment, image processing and/or white balancing operations described herein may be done using logic other than logic illustrated in FIG. 1. In at least one embodiment, parameters may be stored in on-chip or off-chip memory and/or registers (shown or not shown) that configure ALUs of processor 1000 to perform one or more image processing and/or white balancing techniques described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

determining that a first image and a second image generated using an image sensor depict a same static scene;

responsive to the determining, determining a noise estimate for the image sensor based at least on a difference between first values of a first subset of pixels of the first image and second values of a corresponding second subset of pixels of the second image;

computing an average pixel intensity value of the first subset of pixels and the second subset of pixels;

associating the noise estimate with the average pixel intensity value; and generating, over time and for the image sensor, a noise profile that includes noise estimates for a plurality of different average pixel intensity values.

2. The method of claim 1, further comprising:

determining one or more conditions of the image sensor associated with the first image and the second image, wherein the noise estimate is associated with the one or more conditions of the image sensor.

3. The method of claim 2, wherein the one or more conditions of the image sensor comprise temperature data measured using one or more temperature sensors associated with the image sensor.

4. The method of claim 3, further comprising:

performing statistical analysis based at least on the temperature data and the noise profile of the image sensor to determine correlations between the temperature data and the noise profile of the image sensor.

5. The method of claim 1, further comprising:

determining, over time, one or more changes to the noise profile; and determining a status of the image sensor based at least on the one or more changes to the noise profile.

6. The method of claim 5, wherein the status of the image sensor comprises failure of one or more components associated with the image sensor.

7. The method of claim 1, wherein the determining that the first image and the second image generated using the image sensor depict the same static scene comprises:

receiving an indication that the image sensor was in a motionless state between generation of the first image and the second image.

8. The method of claim 1, wherein the determining that the first image and the second image generated using the image sensor depict the same static scene comprises:

determining an amount of pixel displacement between the first image and the second image; and determining that the amount of pixel displacement is below a threshold amount of pixel displacement.

9. The method of claim 1, wherein the image sensor is a high dynamic range (HDR) sensor.

10. The method of claim 1, wherein the determining the noise estimate is performed while the image sensor is operating on a machine deployed in an environment.

11. The method of claim 1, further comprising:

applying one or more noise reduction algorithms to reduce noise associated with at least the first image or the second image based at least on the noise estimate.

12. A system comprising:

an image sensor; and a processing device, coupled to the image sensor, the processing device to:

determine that a first image and a second image generated using the image sensor depict a same static scene;

based at least on the determination, determine a noise estimate for the image sensor based at least on a difference between first values of a first subset of pixels of the first image and second values of a corresponding second subset of pixels of the second image;

compute an average pixel intensity value of the first subset of pixels and the second subset of pixels;

associate the noise estimate with the average pixel intensity value; and generate, over time and for the image sensor, a noise profile that includes noise estimates for a plurality of different average pixel intensity values.

13. The system of claim 12, the processing device further to:

determine one or more conditions of the image sensor associated with the first image and the second image, wherein the noise estimate is associated with the one or more conditions of the image sensor.

14. The system of claim 13, wherein the one or more conditions of the image sensor comprise temperature data generated using one or more temperature sensors associated with the image sensor.

15. The system of claim 12, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system for presenting at least one of augmented reality content, virtual reality content, or mixed reality content;

a system for hosting one or more real-time streaming applications;

a system implemented using an edge device;

a system implemented using a robot;

a system for performing one or more conversational AI operations;

a system implementing one or more language models;

a system implementing one or more large language models (LLMs);

a system for performing one or more generative AI operations;

a system for generating synthetic data;

a system incorporating one or more virtual machines (VMs);

a system implemented at least partially in a data center; or a system implemented at least partially using cloud computing resources.

16. One or more processors comprising processing circuitry to:

determine that a first image and a second image generated using an image sensor both depict a same static scene;

based at least on the determination, determine a noise estimate for the image sensor based at least on a difference between first values of a first subset of pixels of the first image and second values of a corresponding second subset of pixels of the second image;

compute an average pixel intensity value of the first subset of pixels and the second subset of pixels;

associate the noise estimate with the average pixel intensity value; and generate, over time and for the image sensor, a noise profile that includes noise estimates for a plurality of different average pixel intensity values.

* * * * *